United States Patent
Tan

(10) Patent No.: US 6,956,891 B2
(45) Date of Patent: Oct. 18, 2005

(54) METHOD AND APPARATUS FOR NON-LINEAR CODE-DIVISION MULTIPLE ACCESS TECHNOLOGY

(75) Inventor: Alfred Keng Tiong Tan, Tsuen Wan (HK)

(73) Assignee: Go-CDMA Limited, Hong Kong (HK)

( * ) Notice: Subject to any disclaimer, the term of this patent is extended or adjusted under 35 U.S.C. 154(b) by 889 days.

(21) Appl. No.: 09/970,768

(22) Filed: Oct. 5, 2001

(65) Prior Publication Data

US 2002/0106004 A1 Aug. 8, 2002

Related U.S. Application Data

(63) Continuation-in-part of application No. 09/730,835, filed on Dec. 7, 2000, which is a continuation-in-part of application No. 09/712,135, filed on Nov. 15, 2000.

(51) Int. Cl.$^7$ ................................................ H04B 1/69
(52) U.S. Cl. ....................................................... 375/140
(58) Field of Search ................................. 375/140, 130, 375/146, 341, 265, 262; 370/342, 335, 320, 441; 714/755, 746, 752

(56) References Cited

U.S. PATENT DOCUMENTS

| | | |
|---|---|---|
| 5,345,472 A | 9/1994 | Lee |
| 5,390,167 A | 2/1995 | Inatsu et al. |
| 5,410,568 A | 4/1995 | Schilling |
| 5,446,757 A | 8/1995 | Chang |
| RE35,402 E | 12/1996 | Schilling |
| 5,604,730 A | 2/1997 | Tiedemann, Jr. |
| 5,712,871 A | 1/1998 | Chang |
| 5,715,236 A | 2/1998 | Gilhousen et al. |
| 5,825,807 A | 10/1998 | Kumar |
| 5,870,414 A * | 2/1999 | Chaib et al. ................. 714/792 |
| 5,905,721 A | 5/1999 | Liu et al. |
| 5,926,500 A | 7/1999 | Odenwalder |
| 5,930,230 A | 7/1999 | Odenwalder et al. |
| 5,938,787 A * | 8/1999 | Stark .......................... 714/755 |
| 5,987,076 A | 11/1999 | Zehavi et al. |
| 5,991,285 A | 11/1999 | Ghosh |
| 6,025,944 A | 2/2000 | Mendez et al. |
| 6,044,486 A | 3/2000 | Underseth et al. |
| 6,064,663 A | 5/2000 | Honkasalo et al. |
| 6,078,576 A | 6/2000 | Schilling et al. |
| 6,091,760 A | 7/2000 | Giallorenzi et al. |
| 6,097,711 A | 8/2000 | Okawa et al. |
| 2002/0097779 A1 * | 7/2002 | Bang et al. ................. 375/144 |

FOREIGN PATENT DOCUMENTS

| | | |
|---|---|---|
| JP | 5767349 | 4/1982 |
| JP | 62217742 | 9/1987 |
| JP | 63164533 | 7/1988 |
| JP | 2202137 | 8/1990 |
| JP | 2272929 | 11/1990 |
| JP | 6216879 | 8/1994 |
| JP | 6268631 | 9/1994 |
| JP | 10229380 | 8/1998 |
| WO | WO9702663 | 1/1997 |
| WO | WO9852365 | 11/1998 |

* cited by examiner

*Primary Examiner*—Khai Tran
(74) *Attorney, Agent, or Firm*—Swidler Berlin LLP

(57) ABSTRACT

A class of n×l nonlinear block codes, termed Go-CDMA codes are constructed using column-reduced and row-reduced Hadamard orthogonal matrices, termed Go-CDMA matrices. Here n,l are positive integers: n chips of user data are transmitted in frames of size $l \leq \alpha n$, where $\alpha$ is the frame expansion factor. The codes map n-vectors containing binary message data to binary or multi-level l-vectors for transmission, where $l \geq n$. The codes are invertible maps for the binary message data, and when there is no message data in some input vector elements, and noise added between the coding and decoding, there is some error correction. The coding uses integer arithmetic and integer quantization operations, preferably certain sign operations. Go-CDMA codes may be implemented in CDMA communication systems to improve performance on many measures over conventional CDMA and TDMA systems. The coding and decoding may include scrambling and descrambling the Go-CDMA coded signal based on random codes.

33 Claims, 14 Drawing Sheets

METHOD AND APPARATUS FOR NON-LINEAR CODE-DIVISION MULTIPLE ACCESS TECHNOLOGY

CROSS-REFERENCE TO RELATED APPLICATION

This application is a continuation in part of co-pending U.S. application Ser. No. 09/730,835 entitled "Method And Apparatus For Non-Linear Code-Division Multiple Access Technology" filed on Dec. 7, 2000, which is a continuation in part of co-pending U.S. application Ser. No. 09/712,135 entitled "Method And Apparatus For Non-Linear Code-Division Multiple Access Technology" filed on Nov. 15, 2000.

FIELD OF THE INVENTION

The present invention relates generally to code division multiple access (CDMA) communications technology and, more particularly, to the selection and use of a class of non-linear spreading codes to improve performance characteristics of CDMA technology.

BACKGROUND OF THE INVENTION

Recent advances in technology have given rise to communications electronics that are faster, consume less power and are less expensive as compared to earlier generations. This in turn has caused rapid growth in the global communications market, which includes both fixed and mobile segments. This rapid growth has manifested itself through increasing numbers of users of communications technologies, and the increasing services and bandwidth available to users. This growth is expected to continue for many years to come.

Current technologies for multi-user communication systems include code division multiple access (CDMA) and time division multiple access (TDMA), both of which are widely implemented in mobile communications. TDMA is used in the United States (IS-136) and Europe (GSM) as a digital wireless technology. CDMA (IS-95) has been implemented in digital wireless systems in the past few years and exhibits certain improved performance characteristics. CDMA accordingly appears poised to overtake TDMA and become the preferred technology for the third generation mobile communications systems, which seek to provide high-speed data services in addition to providing high-quality voice services.

CDMA and TDMA have different performance characteristics in several areas. CDMA works by coding message bits into code sequences, which in turn are modulated for transmission over a wireless channel. In contrast to TDMA, the coding allows correction of some transmission errors due to noise in the channel, at least when there is less than full occupancy of the communication channel.

In a widely used mobile cellular implementation of CDMA, up to 64 (or 256) signals are transmitted in parallel from a base station to mobile units. In realistic noise environments, this number is limited by the peak power that can be transmitted by law or other considerations. There is accordingly a necessary balance between the transmitted signal power of the composite CDMA signal and the number of parallel CDMA active users supported. Although a higher transmitted signal power will usually result in a better coverage and signal reception at the receivers, this will also result in higher noise in neighboring cells. A performance indicator for mobile communication systems is the peak-to-average power (PAP) magnitude of the composite CDMA signals. High PAP has always been an inherent problem of CDMA systems. Pulse shaping and complex modulation techniques such as continuous phase modulation techniques have been developed to alleviate negative effects of high PAP.

Despite the aforementioned techniques and because of the aforementioned techniques, problems persist. The problems may manifest themselves, for example, through the introduction in CDMA systems of data channels devoted to pulse shaping and complex modulation techniques. Devoting channels to this purpose may lower the overall bandwidth of the system. Another consequence is that CDMA systems may require more expensive electronics, such as linear power amplifiers with high dynamic range, to handle signals with high PAP or with many data channels. This can be particularly problematic for mobile communication units where the cost per unit is sensitive.

Accordingly, there is a need for a new system and method for leveraging the advantages of CDMA that can increase the performance of CDMA to allow its operation in a third generation environment of high-data rates. There is a further need for a system which alleviates problems associated with high PAP. There is still a further need for such improvements in CDMA performance to be capable of low-cost implementation in hardware, software or firmware within existing CDMA systems to realize performance improvements. There is still a further need for systems which reduce PAP thus eliminating or reducing the need for signal shaping data channels or expensive electronics, such as linear power amplifiers with high dynamic range.

Alternatively, there is also a need for developing codes with better tolerance to non-linear distortions when transmitted as a high PAP composite signal.

SUMMARY OF THE INVENTION

According to the present invention, the performance of code division multiple access technology is enhanced through the use of a new class of non-linear block codes during code division multiple access signal coding. This class of non-linear block codes is termed Go-CDMA codes and is defined in terms of its mathematical properties in the Detailed Description section. By way of summary, the Go-CDMA codes are n×l nonlinear block codes constructed using column-reduced and row-reduced Hadamard orthogonal matrices, termed Go-CDMA matrices. The parameters n,l are positive integers: n represents chips of user data transmitted in frames of size $1 \leq \alpha n$, where $\alpha$ is the frame expansion factor. The codes map n-vectors containing binary message data to binary or multi-level l-vectors for transmission, where $l \geq n$.

Go-CDMA codes have application in code-division multiple access communication systems, giving improved performance on many measures over conventional CDMA and TDMA systems. These measures include, for example, peak-to-average power ratio (PAP), error correction as a function of l/n and n/A, channel capacity C in terms of message data rates, transmitted bit error rate as a function of signal-to-noise ratios (SNR), signal-to-interference ratio (SIR), where the interference is from neighboring cells, upper limits to the active-user numbers in a communication cell, and computational effort in coding and decoding.

Go-CDMA codes and coding are well suited for implementation in any CDMA system. They are particularly well suited for high-bandwidth CDMA systems such as third generation and following CDMA systems. Moreover, in any CDMA system including a mobile communications unit, a base station, a transmitting station or receiving station that transmits parallel data message streams, Go-CDMA implementation may allow less signal shaping overhead and less expensive electronics to be implemented than conventional CDMA systems would allow.

According to an embodiment of the present invention, a method for coding a code division multiple access signal based on Go-CDMA codes, includes providing majority logic coding blocks, where each block comprises a Go-CDMA matrix. The method further includes coding a data message based on the majority coding blocks and transmitting the coded data message over a communication channel.

The majority coding blocks may comprise of a single coding stage, two coding stages, three coding stages or more than three coding stages. The method may further comprise coding a plurality of data messages based on the majority coding blocks. The data messages may include at least one data message associated with an active user, at least one data message associated with a pseudo active user and/or at least one of the data messages associated with an inactive user. There may also be a permutation stage between each adjacent pair of coding stages depending on whether or not multiple coding stages are implemented. The majority coding logic blocks may also be implemented as a look up table. In this scenario, the coding is performed based on the look up table.

The data messages may include data elements in ternary format or in polar binary format. Moreover, each of the data messages may be derived from data received from an intermittent data source.

According to another embodiment of the present invention, a method for decoding a code division multiple access signal includes providing majority logic decoding blocks, where each block comprises a Go-CDMA matrix based on Go-CDMA codes. The method further includes receiving a signal over a communication channel and decoding a data message from the signal based on the majority coding blocks. This method is essentially the reverse of the coding process described above.

According to another embodiment of the present invention, a method for providing a code division multiple access signal includes coding at least one data message stream based on Go-CDMA codes, scrambling the coded data message stream based on random codes, and transmitting the scrambled coded message stream over a communication channel. A plurality of data message streams may be coded, scrambled and transmitted together in this manner over a wireless medium. The method may be executed, for example, at a mobile communication unit or a base station. Moreover, the data message streams may be related, unrelated or a serial data stream. When the method is implemented at a base station, the data message streams may be associated with different mobile units, each of which may have associated with it multiple data streams. The method may include coding at least some of the data message streams based on non-Go-CDMA codes, scrambling the non-Go-CDMA coded data message streams based on random codes, and transmitting the scrambled non-Go-CDMA coded data message streams along with the Go-CDMA coded data message streams over a communication channel.

A method of decoding Go-CDMA signals may include receiving the scrambled coded message stream over a communication channel, descrambling the coded data message stream based on the random codes and identification information identifying the random codes and decoding the data message stream based on the Go-CDMA codes. The identification information may be determined based on data in a pilot signal or information derived from the call set-up handshaking protocols. The method may further include receiving the scrambled coded message stream over a communication channel, descrambling non-Go-CDMA coded data message streams and Go-CDMA coded data message streams based on the random codes and identification information identifying the random codes, separating the non-Go-CDMA coded data message streams from the Go-CDMA coded data message streams based on the identification information, and separately decoding the non-Go-CDMA coded data message streams and the Go-CDMA coded data message streams.

According to another embodiment of the present invention, Go-CDMA codes are used as non-linear distortion tolerant replacement in the standard multi-code CDMA (MC-CDMA) coding schemes. In this embodiment where Go-CDMA codes are used instead of ordinary orthogonal codes, the resulting high PAP composite signal is more tolerant to signal corruption due to non-linear distortion introduced by high power amplifiers and other non-linear interferences in the communications system.

BRIEF DESCRIPTION OF THE FIGURES

The above described features and advantages of the present invention will be more fully appreciated with reference to the detailed description and appended figures, in which.

Figure 11:
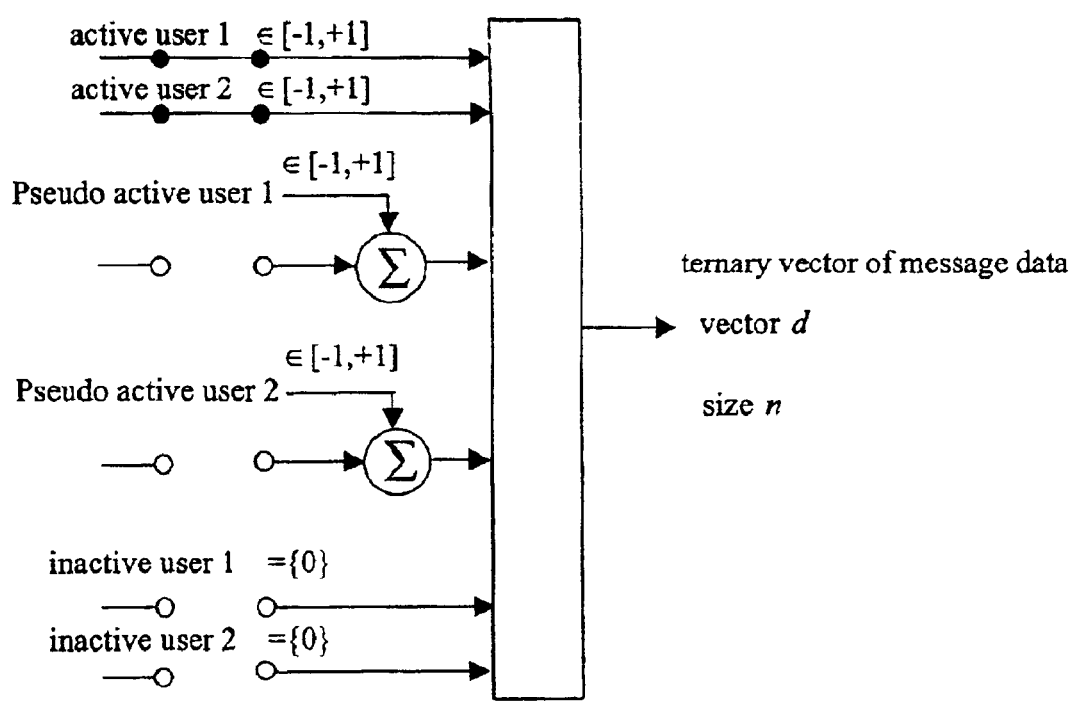

FIG. 11 depicts active user data and psuedo-active user data as a data vector d according to an embodiment of the present invention.

Figure 12:
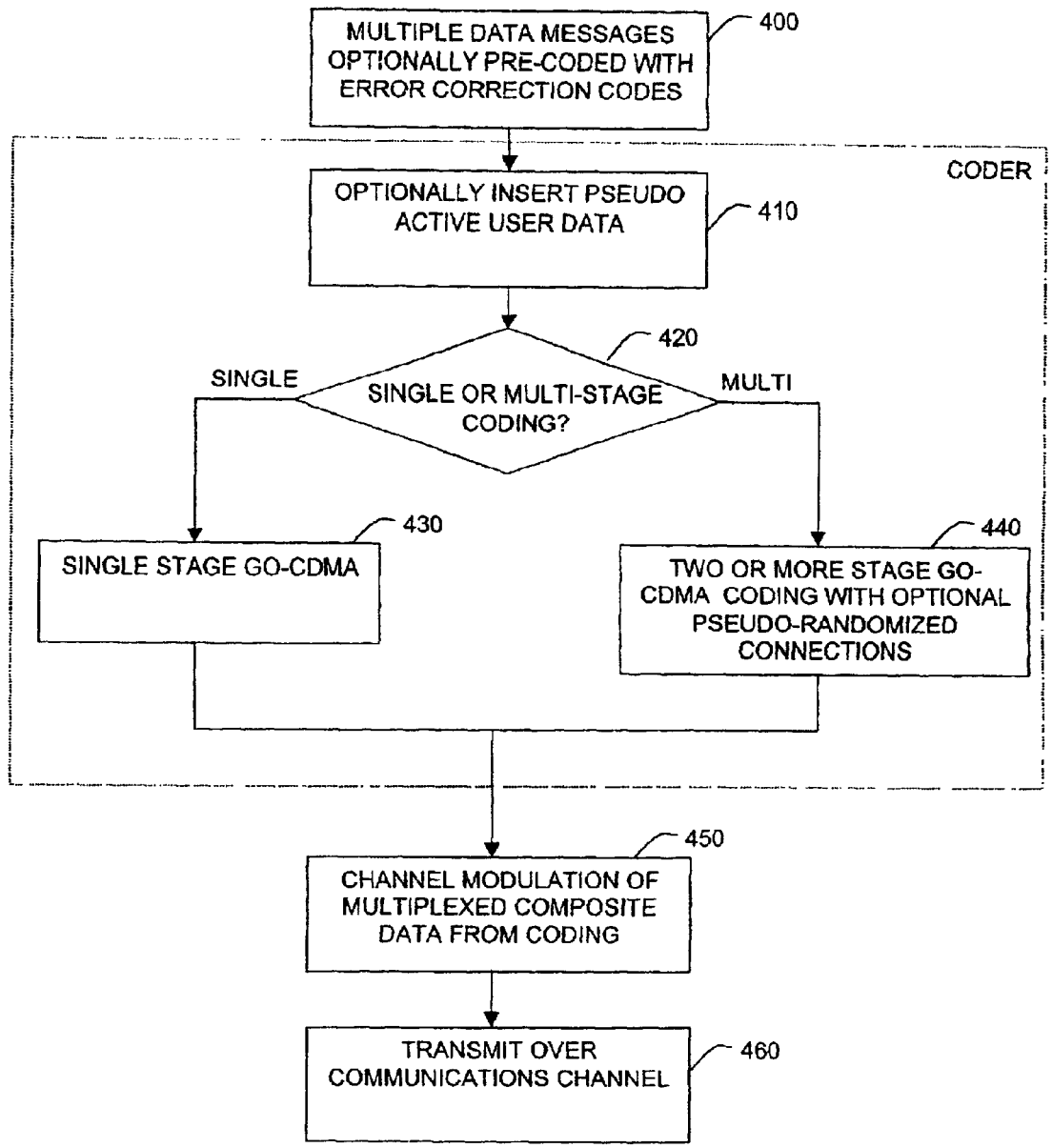

FIG. 12 depicts a method of coding data for transmission within a CDMA system according to an embodiment of the present invention.

Figure 13:
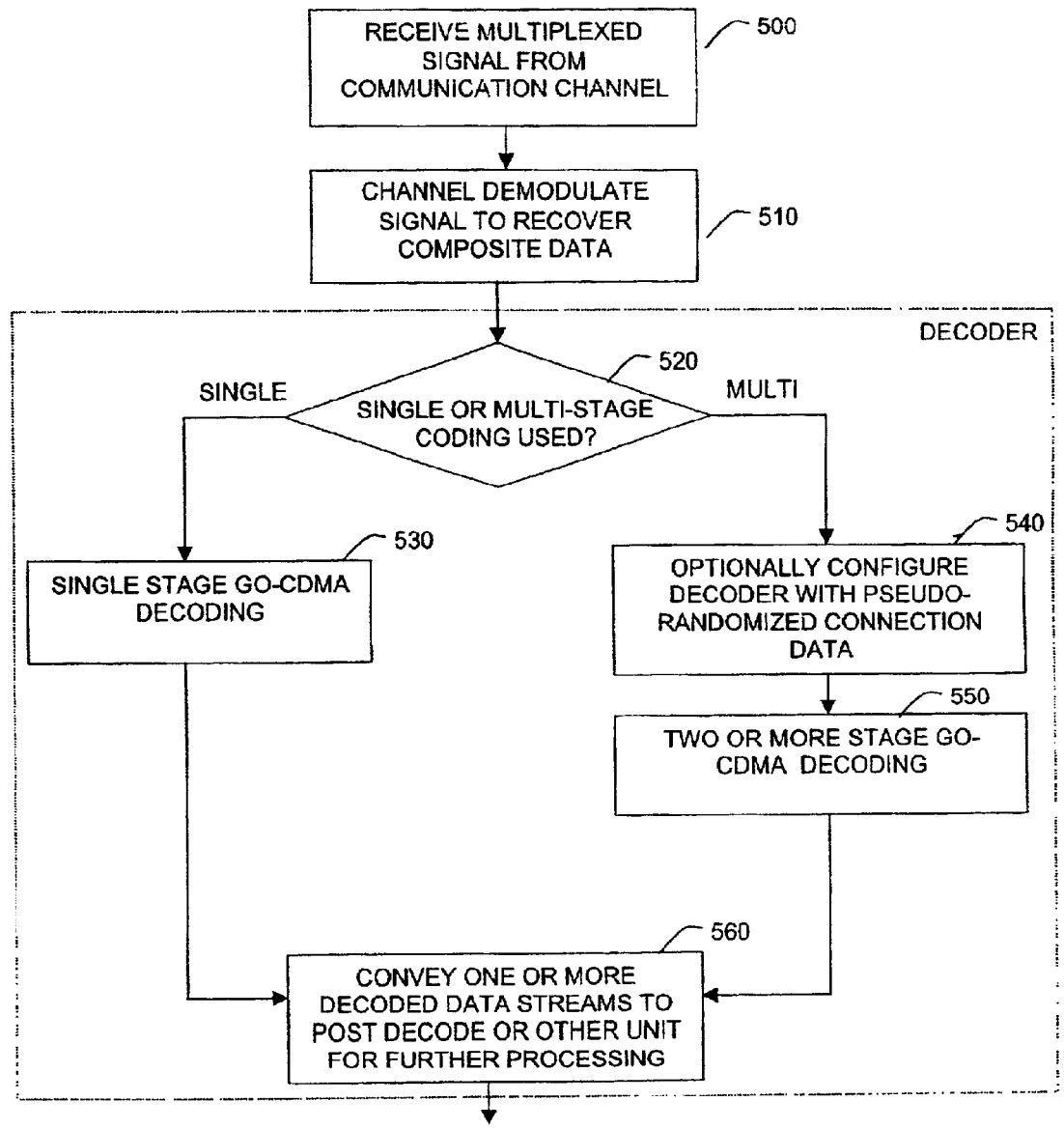

FIG. 13 depicts a method of decoding data received within a CDMA system according to an embodiment of the present invention.

Figure 14:
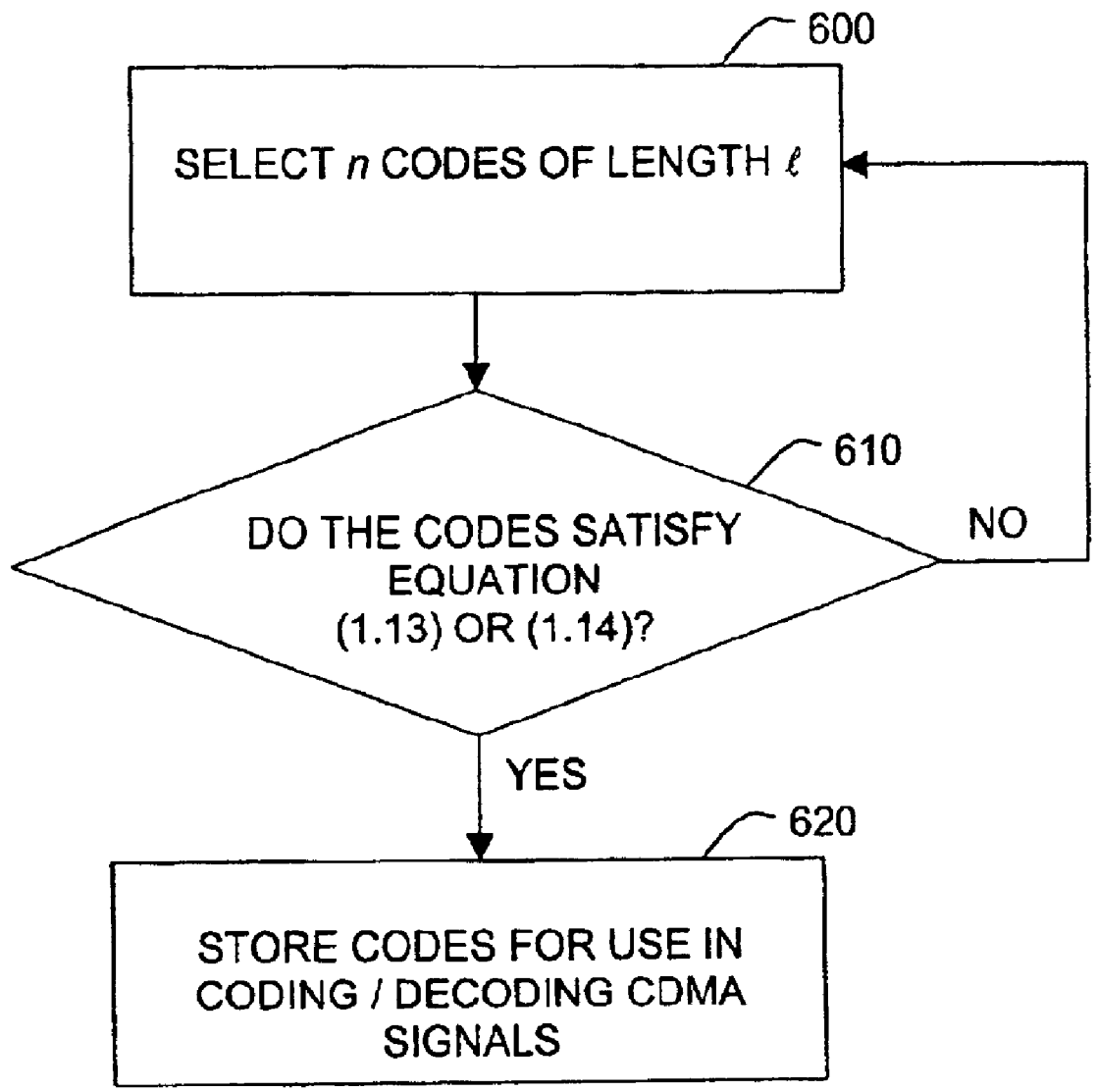

FIG. 14 depicts a method of generating Go-CDMA codes according to an embodiment of the present invention.

Figure 15A:
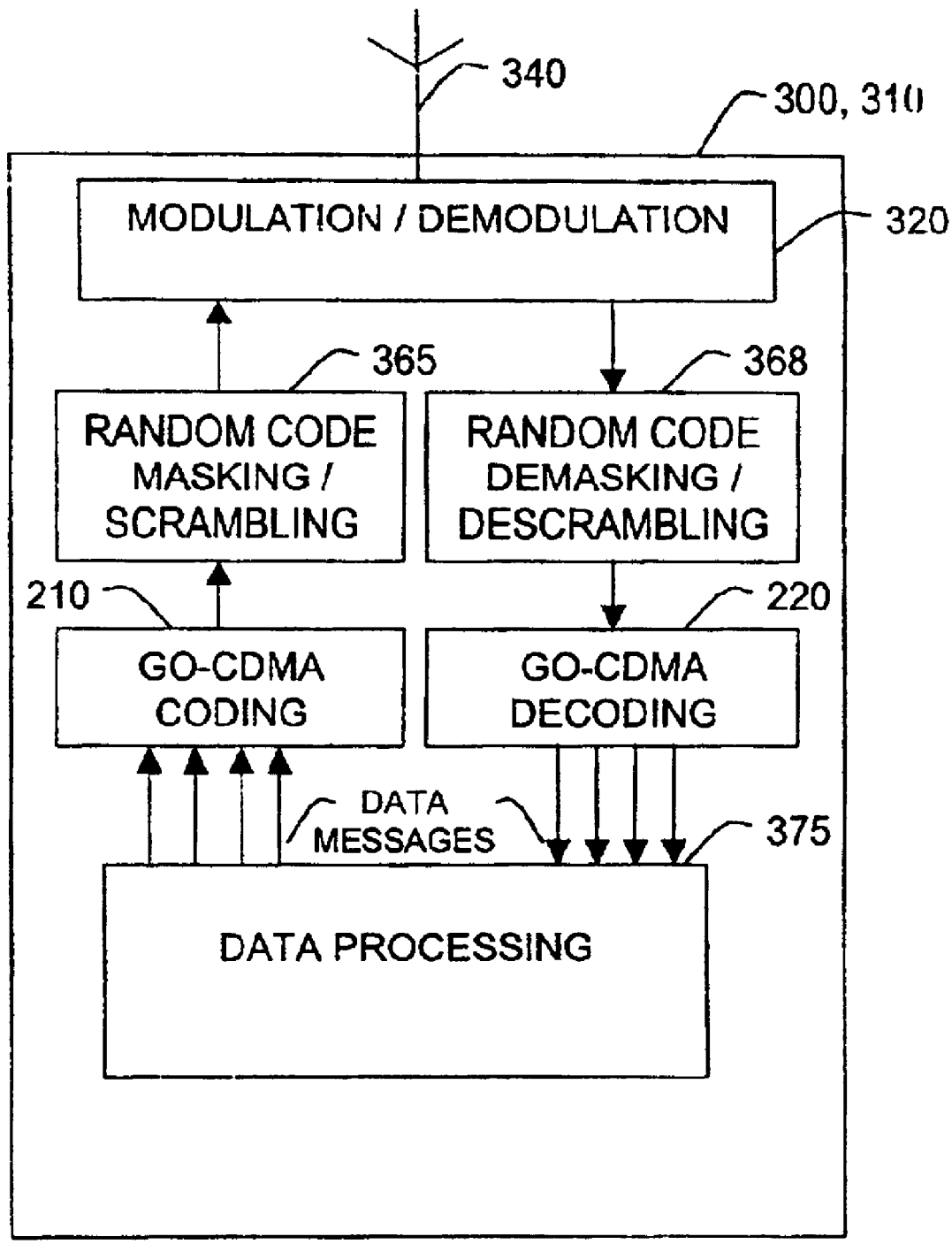

FIG. 15A depicts a functional block diagram of a Go-CDMA system used in mobile communications which incorporates random scrambling codes into the coding and decoding scheme according to an embodiment of the present invention.

Figure 15B:
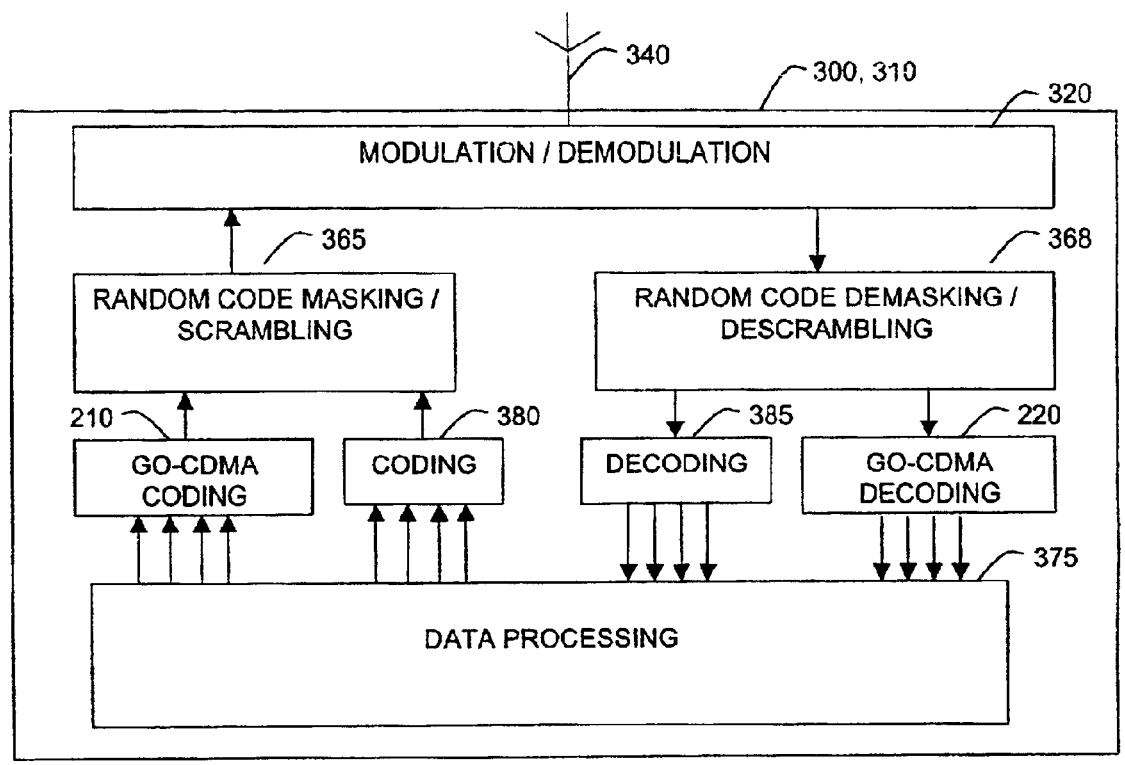

FIG. 15B depicts a functional block diagram of a Go-CDMA system used in mobile communications which incorporates random scrambling codes into the coding and decoding scheme and which permits Go-CDMA coding and another coding scheme to be simultaneously implemented at the same base station or mobile unit or to be implemented in a dual-mode mobile unit configuration at the mobile unit according to an embodiment of the present invention.

DETAILED DESCRIPTION

The performance of code division multiple access (CDMA) technology is enhanced through the use of a new class of non-linear block codes during CDMA signal coding (and decoding). This class of non-linear block codes is termed Go-CDMA codes and is defined in terms of its mathematical properties in the Go-CDMA Technology Overview and Go-CDMA Matrices, Coding, Decoding and Preferred Embodiments sections below. Prior to describing Go-CDMA coding and decoding according to the present invention, an overview of pertinent communications technologies is presented including an overview of those technologies in which Go-CDMA coding and decoding may be implemented.

I. Overview of Relevant Communication Technologies and Coding Schemes

Current technologies for single cell, or multiple cell, multi-user communication systems include CDMA and time-division-multiple-access (TDMA). These technologies are widely used for mobile communication, with TDMA being the basis of the GSM mobile telephone system used in Europe.

Figure 1:
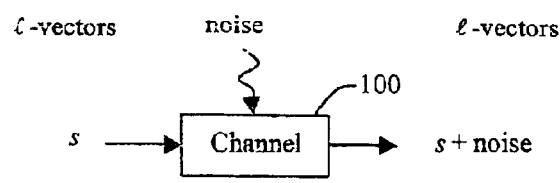
FIG. 1 depicts a communication channel with additive noise.

To illustrate such communications systems, FIG. 1 illustrates an environment in which multi-user communication systems exist. Referring to FIG. 1, a communication channel 100 is illustrated as having additive noise on it. The communication channel may be, for example, air, space, an electrical connection such as a wire, transmission line, or microwave element or an optical fiber. An incident signal s traversing the communications channel 100 is influenced by noise in the communications channel resulting in a signal s+noise at the far end of the transmission line.

Figure 2:
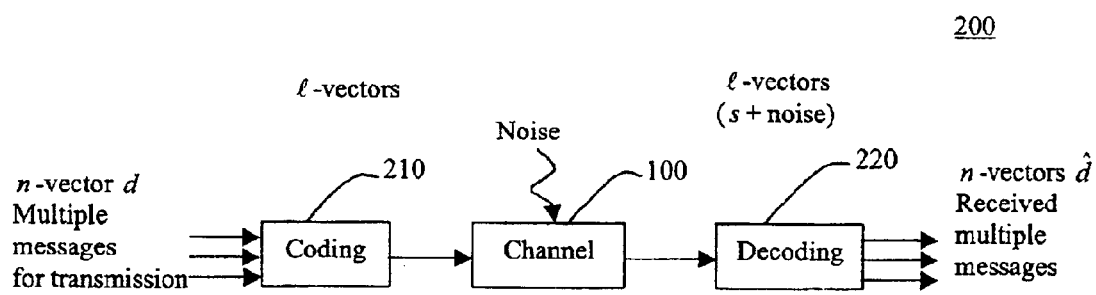
FIG. 2 depicts a multiple access coding-decoding communication system according to an embodiment of the present invention.

FIG. 2 depicts a schematic of a multiple-access, coding-decoding communication system 200. The system 200 includes multiple messages for transmission as inputs to a coding block 210. The coding block 210 encodes the messages and transmits the encoded messages as a composite signal over the noisy communications channel 100. The decoding block 220 receives the composite signal which includes noise and decodes the encoded messages through a process that is in general the reverse of the coding process.

Both the coding block 210 and the decoding block 220 are depicted as single blocks. In the case of multiplexed optical fiber communications systems, for example, there may indeed be single coding and decoding blocks which interface with the optical fibre which is the communications channel 100. Alternatively, in mobile communications systems, for example, one or both of the coding block 210 and the decoding block 220 actually be implemented as multiple respective coding or decoding blocks, each with an unique spatial position relative to each other. This scenario is depicted in FIGS. 3A and 3B.

Figure 3A:
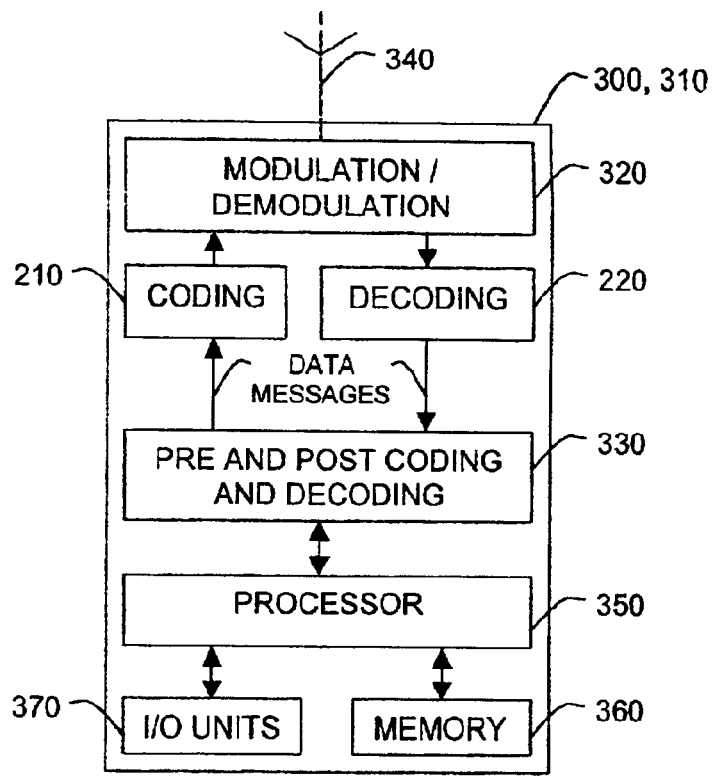
FIG. 3A depicts functional block diagrams of a CDMA system used in mobile communications which incorporates coding and decoding blocks according to an embodiment of the present invention.
Figure 3B:
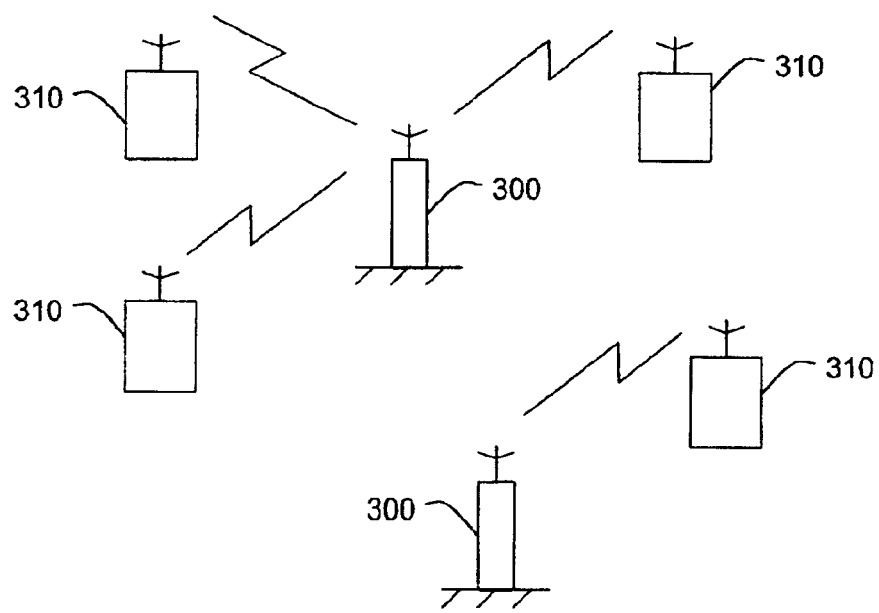
FIG. 3B depicts an illustrative view of a plurality of mobile units engaged in cellular communications over a noisy wireless channel with base stations.

Referring to FIG. 3A, a communications device is illustrated. The communications device may be any communications device including, for example, a base station 300 or a mobile communications unit 310 used in cellular communications. The device 300, 310 may include a modulation/demodulation unit 320 coupled to an antenna 340, coding and decoding units and 210 and 220 respectively, an optional pre and post coding and decoding unit 330, a processor 350, a memory 360 and I/O units 370.

The processor 350 may be a microprocessor, a microcontroller, a digital signal processor, an application specific integrated circuit or any other device suitable for controlling the operation of the device 300, 310. The processor 350 controls the operation of the device 300 and 310 and may be coupled to each of the functional blocks within the device to control their operation. Alternatively, any or all of the functional blocks depicted as within the device 300, 310 may not be implemented on devices separate from the processor. Rather, they may be functions performed by the processor. The processor may control the device 300, 310 by executing program instructions stored in the memory 360 causing the functional units, regardless of their physical embodiments, to become operative.

The memory 360 stores data and may store program instructions for execution by the processor 350 or other elements within the device 300, 310. The memory may include volatile memory, non-volatile memory or both. The memory may include, for example read only memory (ROM) and read only memory devices such as CD-ROM devices, hard and floppy disk drives, random access memory (RAM), databases and any other type of memory or memory device.

The I/O units 370 may include any type of input/output devices, including a display, a keyboard, a microphone, a speaker, a camera, a vibrating device, a modem for connecting to a network such as the PSTN, a local or wide area network or the interconnected network of servers, routers and bridges collectively known as the Internet.

During operation, the processor 350 may cause the device 300, 310 to open a communications channel via the antenna 340 with another communications device pursuant to the CDMA or TDMA protocol. In the case of wireless cellular telephony, the communications channel may be used to place a telephone call. The processor 350 also may receive signals from the I/O units 370 or the memory 360, such as voice or data signals, and may output data messages to the pre and post coding and decoding unit 330 based on the received data or voice signals. The data messages may in turn be sent through the coding unit 210 and the modulation/demodulation unit 320 and out the antenna 340 pursuant to the appropriate communications protocol. Similarly in the reverse direction, the processor may receive data messages via the antenna 340, the decoding unit 220, the pre and post decoding unit 330. The processor may then output a signal or other data, based on the received data messages, to one or more of the I/O units 370 or may store the data in the memory 360. In this manner the device 300, 310 may perform communications functionality on behalf of a user of the device.

The pre and post coding and decoding block 330 is optional and may be used to, for example, insert (or decipher in the case of decoding) error correcting codes into the data messages, to interleave or de-interleave data or to otherwise manipulate the data messages prior to coding or after decoding. In the case of inserting error correction codes, any error correction or error protection schemes may be used including cyclical redundancy check (CRC) schemes and forward error correction (FEC) schemes.

The coding and decoding blocks may be conventional CDMA or TDMA coding blocks. Alternatively, the coding and decoding blocks 210 and 220 may implement the Go-CDMA spreading code scheme for enhanced CDMA performance according to the present invention. Alternatively, both may exist in mixed systems as shown, for example, in FIG. 15B.

The modulation/demodulation unit 320 may be implemented with any appropriate amplifier to create a modulated output signal s based on either the TDMA or CDMA scheme, including CDMA schemes with Go-CDMA technology.

When a CDMA capable communications device 300, 310 includes a processor or other device that executes program instructions to perform the coding and decoding functions of blocks 210 and 220, the memory 360 may be updated with data and programming instructions to configure the coding and decoding blocks 210 and 220 to implement the Go-CDMA coding and decoding scheme according to the present invention. The program instructions and data may be loaded into the memory 360 via one or more of the I/O units 370 or via data received from the antenna 340.

FIG. 3B depicts an illustrative view of a plurality of mobile units 310 engaged in cellular communications over a noisy wireless channel 100 with base stations 300. The mobile stations 310 and each of their respective coding units 210 may collectively be considered equivalent to the single coding unit 210 depicted in FIG. 2 for coding n data messages for transmission over a noisy channel 100. In this scenario, the base station unit and its decoding unit 220 may be considered equivalent to the single decoder 220 depicted in FIG. 2 for decoding n received data messages in a composite signal plus noise.

Several coding schemes for multiplexing data messages are conventionally used. Included among them are:
  Orthogonal-CDMA using linear Hadamard matrix block codes.
  Direct sequence, pseudo-random CDMA using linear pseudo-random codes.
  TDMA uses a (trivial) unity element of the class of orthogonal CDMA codes.
  Multi-Code CDMA (MC-CDMA).

In the third generation standards for wideband mobile communication, a CDMA approach has been chosen. A latent technology is Majority Logic Coding which has not yet delivered significantly for any widely used communications system. These schemes are now discussed in terms of their properties.

System Capacity: For a given communication channel subject to noise, there is a theoretical upper data transmission rate, termed the Shannon-Hartley Channel Capacity, at which data can be transmitted error free. Practical schemes fall short of this limit. In a multi-cell wireless environment, TDMA uses so-called frequency planning, which means that neighboring cells do not operate in the same frequency band. CDMA uses frame expansion factor through direct spreading, in order to avoid frequency planning.

Error Correction Properties: In the case of CDMA, there is some correction of chip errors due to noise on the channel. The errors corrected are independent of the active user number $A \leq n$. Here n is the user number upper limit. When A is n, then there is full occupancy, or in other words a maximum loading situation.

In the case of TDMA, error correction due to noise in the communication channel is not possible, irrespective of whether or not the channel is operating at less than full loading. There is then no error-correction gain from an increase in the upper user number limit n, as there is for the competing technology CDMA.

The Hamming distance between the code words is a key determinant of the error correction capability of a linear block-coding scheme. The greater this distance, the greater the error correction capability. This distance is at a minimum of 2 for TDMA with n>1, and at a maximum of l/2 for CDMA n×l block codes where $1 \geq n$ is a power of 2, that is 2, 4, 8, 16, 32 . . . . Typically, direct sequence, orthogonal CDMA codes are square with l=n, and followed by pseudo-random CDMA codes.

Figure 4:
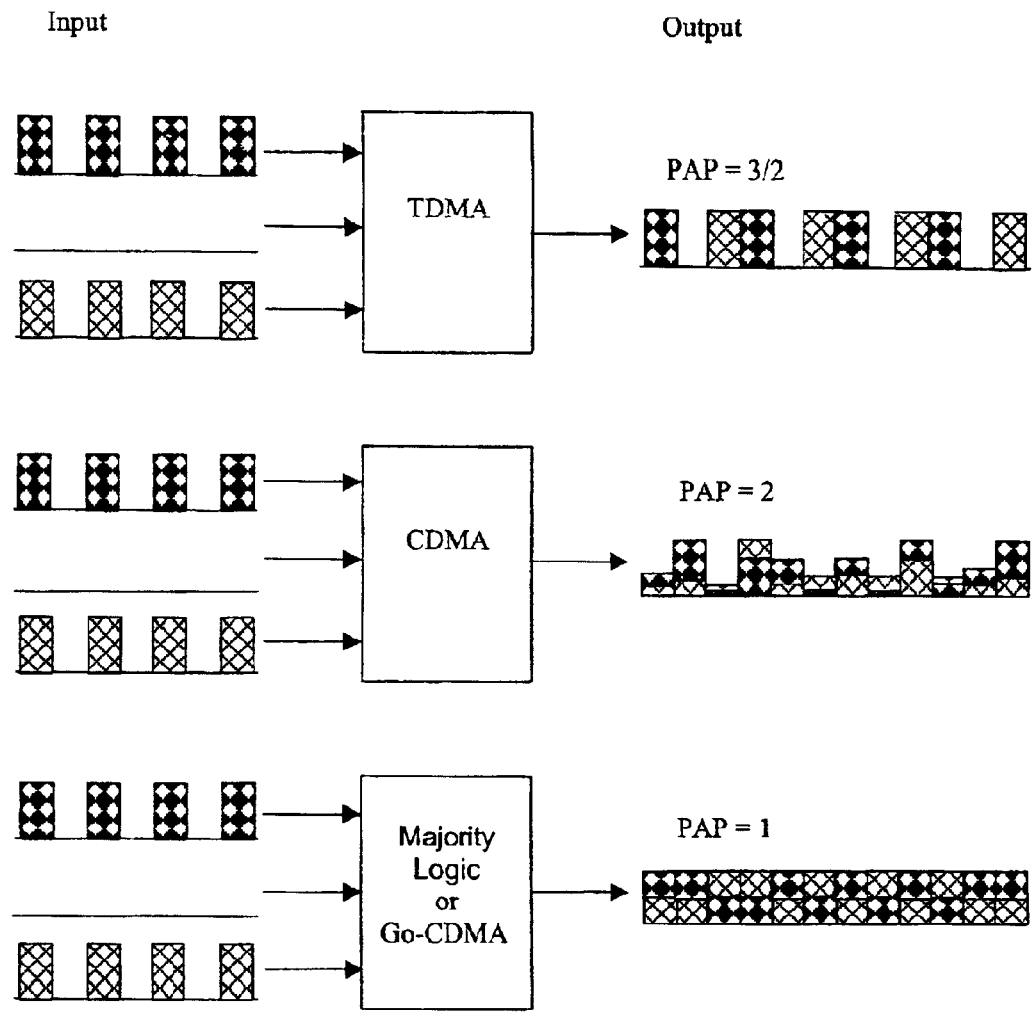
FIG. 4 depicts an illustration of transmitted peak to average power for TDMA, CDMA and Majority Logic systems.

Peak-to-Average Power Property: The peak power permitted to be transmitted in a communication cell is limited, either by law or other considerations. The peak-to-average transmitted power ratio is denoted PAP. For TDMA the PAP is unity under full loading and is n/A otherwise, see FIG. 4. A PAP of unity is desirable so as to maximize signal-to-noise ratio (SNR), given peak power limits.

In CDMA, the transmitted signal is the summation of A synchronized polar, binary signals. It is termed an A-ary signal. In CDMA the peak-to-average power ratio is A. This ratio increases with the number of active users accommodated in the channel. Note that in theory, this increase limits the number of users n that can simultaneously use any CDMA wireless communication cell, but in practice, power control algorithms reduce the actual PAP of a CDMA system.

Computational Effort: Computational effort limitations in, for example, a mobile or low-cost receiver are more critical than in a hub station transmitter. Computational effort also affects receiver power consumption and battery life at the margins. CDMA systems require vector integer multiplication and sparse matrix integer multiplication operations. The corresponding calculations for TDMA are trivial.

Majority Logic Codes: There are nonlinear codes, termed here majority logic codes, which have application to CDMA coded signals according to embodiments of the present invention in communication systems. To multiplex n users, code word lengths of $1 \geq 2^n - 1$ are proposed. With n=3, $1 \geq 7$; n=4, $1 \geq 15$; $n \geq 5$, $1 \geq 63$; n=6; $n \geq 127$; n=7, $1 \geq 255$, and so on. The frame expansion factor α becomes unrealistically high for applications as n increases, because of the associated system capacity loss. Such codes are not yet exploited significantly in the market place, and indeed recent research by others has concluded that their best future, in the absence of a major breakthrough, could be in niche markets with low user numbers. Their attractive property for applications, is that the PAP value is unity, as in TDMA, see FIG. 4. Also there is some error correction at less than full occupancy, although there can be error introduction for some levels of occupancy. There is simplicity of implementation since the non-linearity in the code consists of merely a sign operation on the output of a linear code. This can be viewed as counting 'yes' or 'no' votes, so the majority logic aspect is simply a majority vote counting.

Most works on majority logic codes have been done for the case of square and single-stage codes for odd numbers of active users up to 7 users, mapping binary message data to binary transmission data. When not all users are active there can be error correction. However, there can also be deterministic errors. That is, errors are created, even for transmission over a noise free channel. This occurs for the case of 5 users and 2 inactive users. In the case of $A \leq n=7$, certain codes have been proposed and studied which use code words of length greater than 7, and although error correction improves, there are still errors in the noise free case for some occupancy levels. Such errors preclude wide acceptance of single stage Majority Logic Coding as it stands.

Figure 5:
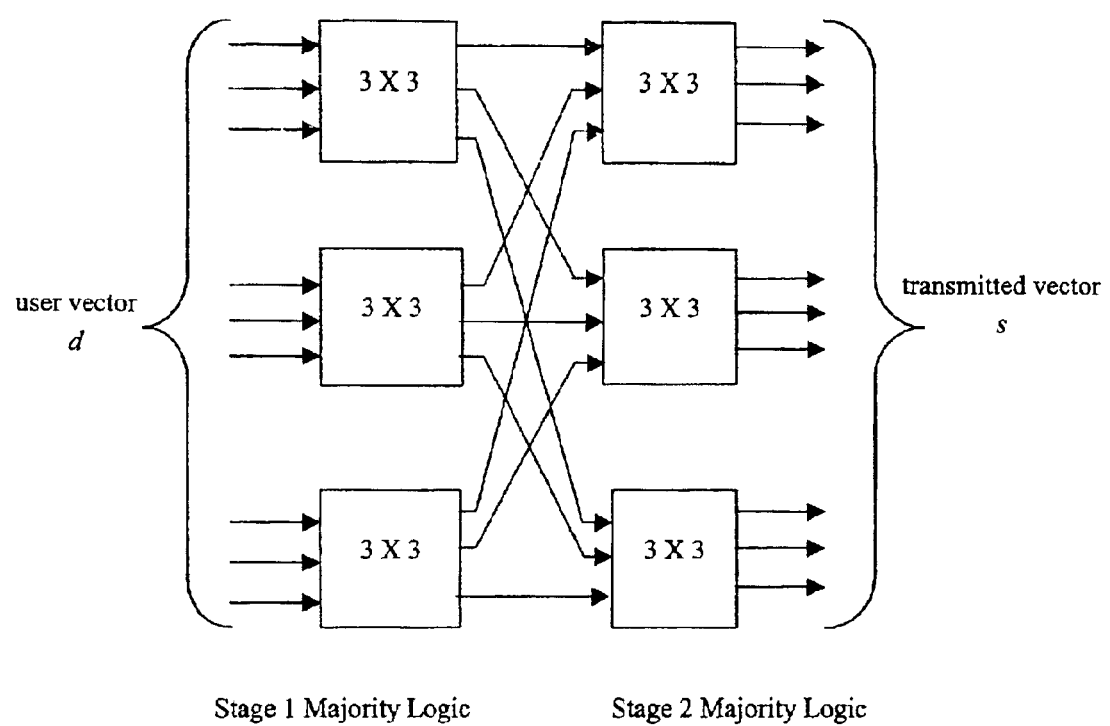
FIG. 5 depicts a two stage Majority Logic coding scheme for encoding (or decoding with arrows reversed) up to nine active communications channels using 3×3 single stage Majority Logic codes according to an embodiment of the present invention.

There is a notion of a two-stage Majority Logic Coding. Simulations have been carried out, for example, on 3×3 codes to achieve a scheme for odd order active users up to 9 users. Standard majority logic coding is first applied to three sets of 3 users. Then the 9 output signals are reordered ready for a further application to 3 lots of 3 signal sets. The decoding is a reverse double majority logic coding process. FIG. 5 depicts the situation.

Majority logic coding, is a nonlinear coding, for which there is no complete theory. The generation of majority logic codes is a problem which appears non-polynomial (NP) hard: The computational effort to exhaust all possibilities grows at least at the rate of the order of $2^{(n \times n)}$, which is 2 to the power n all squared. Not withstanding this, applicants have discovered that Go-CDMA codes are a class of codes which realize the potential of a nonlinear logic coding approach.

A Hadamard matrix is a matrix $H(n)$ with elements in the set $\{-1,+1\}$ such that $H(n) \times H(n) = n \times I(n)$. A square n×n real matrix $H(n)$ for n exist if n is a factor of 4. This includes the Hadamard square n×n real matrices $H(n)$ for n a power of 2. That is, n belongs to a set denoted N consisting of elements $\{2^m\}$ where m is the set of positive integers $Z^+ = \{1, 2, 3, 4, \ldots\}$. Thus $$N = \{n = 2^m | m \in Z^+\}, \text{ or } N = \{2, 4, 8, 16, 32, \ldots\}. \quad (1.0)$$

These Hadamard matrices $H(n)$ for n a power of 2 can be simply constructed from a recursion involving the Kronecker product of polar, binary-form matrices with elements in the set $\{-1,+1\}$ as follows:

$$H(2^{(m+1)}) = H(2) \otimes H(2^m), \ H(2) = \begin{bmatrix} 1 & 1 \\ 1 & -1 \end{bmatrix}. \quad (1.1)$$

This Kronecker product operation $\otimes$, replaces a $\{+1\}$ in $H(2^m)$ by $H(2)$ and a $\{-1\}$ by $-H(2)$. For example, $$H(4) = \quad (1.2)$$

$$H(2^{1+1}) = H(2) \otimes H(2^1) = \begin{bmatrix} H(2) & H(2) \\ H(2) & -H(2) \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

More generally, recall that with $X=(x_{ij})$ a matrix of scalar elements $x_{ij}$ at the intersection of the $i^{th}$ row and $j^{th}$ column, then $X \otimes Y$ is a matrix built from X with $x_{ij}$ replaced by the matrix $x_{ij}Y$.

The Hadamard matrix $H(n=2^m)=(h_{ij})$ is then an (n×n) matrix with elements $h_{ij}$ taking values in the set $\{-1,+1\}$; that is, $H(n)$ is a matrix in polar, binary-form. Let $h_i^r$ denote the $i^{th}$ row of H and $h_i^c$ denote the $i^{th}$ column of H, then $H=[h_1^c, h_2^c, \ldots h_n^c]$, $H'=[h_1^r, h_2^r, \ldots h_n^r]$. Here the prime denotes the matrix transpose. That is, $H'=(h_{ji})$, or equivalently, to form H', elements $h_{ij}$ in H are replaced by $h_{ji}$ for all i, j.

The unipolar, binary-form of a polar matrix, with elements in the set $\{0, 1\}$, is obtained by first adding unity to all of the polar matrix elements, and then dividing the result by 2. The polar form of the matrix is recovered by multiplication by 2 and then subtracting unity from all elements.

The matrix rows of a unipolar binary matrix $H(n)$ can be viewed as binary numbers each with n binary digits (reading left to right say). These have decimal equivalents. Likewise for the columns, or more simply the rows of the matrix transpose. Thus $H(n)$ can be represented by a set, or sequence, of n decimal numbers.

The Hadamard matrix H is orthogonal, in that H'H is n times the identity n×n matrix $I(n)$. That is, H'H has n diagonal elements that are all n, and there are zeros elsewhere.

Coding using Hadamard Matrices is now described. This is the basis of first-stage orthogonal-CDMA coding. Consider a data column n-vector d data given discrete time. For simplicity of presentation, assume that each element d, of d is generated by a particular user, termed the $i^{th}$ user; there being a set of n possible users. The data from an active user is $\{-1\}$ or $\{+1\}$, and from an inactive user is set as $\{0\}$. In general then, d is a ternary data vector.

In Hadamard matrix coding, the data transmitted is actually an n-vector which results from standard vector-matrix multiplication as follows:

$$s = Hd. \quad (1.3)$$

Thus the $i^{th}$ element of s is $s_i$=sum of scalar products $(h_{ij}d_j)$ over all j. It is clear that with A active users, $s_i$ is a signed integer in the range $\{-A,+A\}$ and results from integer multiplication.

The recovery of d from s is possible by the inverse operation, $$d = \frac{H's}{n} = \text{sign}\left(\frac{H's}{n}\right), \quad (1.4)$$

where the sign of a vector is the sign of each element, as follows:

$$\text{sign}(x) = \begin{cases} +1 & \text{if } x > 0 \\ 0 & \text{if } x = 0 \\ -1 & \text{if } x < 0 \end{cases}. \quad (1.5)$$

Alternatively, non-conventional definitions of a sign function can be given as follows:

$$sgn(x) = \begin{cases} +1 & \text{if } x \geq 0 \\ -1 & \text{if } x < 0 \end{cases}, \text{ or } sgn(x) = \begin{cases} +1 & \text{if } x > 0 \\ -1 & \text{if } x \leq 0 \end{cases}. \quad (1.6)$$

Note that (1.6) are the preferred definitions of the sign operation in the present embodiments of Go-CDMA. While the definition in (1.6) is not new, its application, instead of (1.5), in multi stage majority logic coding, is new and may be implemented according to embodiments of the present invention. The nonlinear operation in (1.5) would result in a ternary output but the output from either operation in (1.6) would be always binary.

The recovery of d follows since H' s=H'H d=nI(n)d=nd, by virtue of the orthogonality of H. Also, the sign operation on a vector with elements in the set $\{-1,+1\}$ introduces no change. In a multi-user system, the $i^{th}$ receiver decodes only the element $d_i$ using only one code word assigned to the $i^{th}$ user, namely the $i^{th}$ row vector of H'. That is, the $i^{th}$ column vector of H, denoted $h_i^c$. Thus, the decoding for the $i^{th}$ user extracts the scalar $d_i$ as $$d_i = \frac{h_i^{c'} s}{n}. \tag{1.7}$$

In the case of error-free transmission, then $d_i$ belongs to the ternary set $\{-1, 0, +1\}$. However, in the case of transmission errors, then for an active user-receiver pair, $h_i^c{}'s/n$ may not be in the set $\{-1, +1\}$, where $\text{sign}(h_i^c{}'s/n)$ is in this set. Thus an estimate of $d_i$, denoted $\hat{d}_i$ is $$\hat{d}_i = \text{sign}\left(\frac{h_i^{c'} s}{n}\right) \tag{1.8}$$

Hadamard codes are a special case of the class of orthogonal codes, since in the above coding, H can be replaced by any orthogonal matrix A with the property AA' proportional to I. The advantage of Hadamard codes is that their elements belong to the set $\{-1, +1\}$, so multiplications are trivial, and their Hamming distance (to be defined below) is at a maximum for such orthogonal codes.

If orthogonal codes with elements, of unipolar binary form, in the set $\{0, 1\}$ are used, and the data from active users are also in unipolar binary form, then the above mentioned matrix coding and decoding process will be a logical exclusive-OR operation instead of the standard vector-matrix multiplication. The standard vector-matrix multiplication approach is usually used, where both the orthogonal codes and active-user data are in the polar binary form.

Hamming Distance and Error Correction: The code words of a linear block code, such as H, are the rows, or columns, of H. The "distance" between two rows, or columns, of a binary code is the number of elements in one row that differ from the corresponding element in the other. The Hamming distance is the minimum distance of all the possible distances between rows or between columns. For a Hadamard code H(n), with $n \in N$, the Hamming distance is $d_{min}=n/2$. Standard theory on Hamming distances shows that $(d_{min}/2)-1$ errors are corrected in decoding.

Pseudo-Random Coding: Pseudo-random coding follows the same pattern as orthogonal coding, save that the elements of the orthogonal code matrix, denoted P, are generated by pseudo-random sequences. Typically, P is a rectangular code ($\alpha n \times n$)-matrix with an integer frame expansion factor $\alpha$. It is block diagonal with identical column blocks, being a pseudo-random code word vector of length $\alpha$. For such coding $$s=Pd, \hat{d}=\text{sign}(P's)=\text{sign}(P'Pd)=d. \tag{1.9}$$

In the case of added channel noise, denoted noise, then $$\hat{d}=\text{sign}(P'(s+\text{noise}))=\text{sign}(d+P'\text{noise}), \tag{1.10}$$

One virtue of this coding is that the term P'(noise) approaches an average of noise terms as $\alpha$ becomes large, which then diminishes the relative effect of the noise, with respect to the signal. This is the case, irrespective of the noise characteristics, so becomes important in multi-cell applications. In this situation, the noise includes interference from neighboring cells. These use different P matrix codes, denoted $P_I$, so that $P'P_I$ is relatively small compared to P'P.

TDMA as coding: In TDMA systems, the H is replaced by the identity, so $s=I(n)d$, and $d=I'(n)s=I'(n)I(n)d=d$. The $i^{th}$ user "decodes" trivially the received signal s to achieve $d_i=s_i$, the $i^{th}$ element of s.

In TDMA, there is frequency division multiplexing of cell signals in order to reduce interference from neighboring cells. The available spectrum is divided into $\beta$ frequency bands, typically $\beta=4$, or so, and neighboring cells are allocated to different bands. There is a process termed frequency planning, to allocate the frequency bands. The avoidance of this process by using pseudo-random-CDMA coding, in CDMA systems, is considered a major advantage of CDMA. In order for the receiver to properly decode signals received from transmitters that implement pseudo-random-CDMA coding, the receiver must be aware of the pseudo-random implementation. This information in the form of the permutation matrix may be transmitted from the transmitter to the receiver via a pilot CDMA channel or via a data channel. Alternatively, all pertinent permutation matrices can be pre-stored in a memory or storage module in the communication device. In this implementation the information sent from the transmitter to the receiver via a pilot CDMA channel or via a data channel is only for locating, within the memory or storage module of the communications device, the correct permutation matrix to be used.

MC-CDMA as coding: In MC-CDMA systems, the Hadamard matrix H is used, so $s=H(n)d$, and $d=H'(n)s=H'(n)H(n)d=d$. As MC-CDMA transmits more than one stream of CDMA-encoded spread spectrum signals in parallel, thus, the transmitted signal potentially has a varying signal level between n and −n, where n is the total number of parallel data streams. A performance indicator for MC-CDMA systems is the peak-to-average power (PAP) magnitude of the composite MC-CDMA signals. High PAP has always been an inherent problem of MC-CDMA systems. Pulse shaping and complex modulation techniques such as continuous phase modulation techniques have been developed to alleviate negative effects of high PAP.

Figure 6:
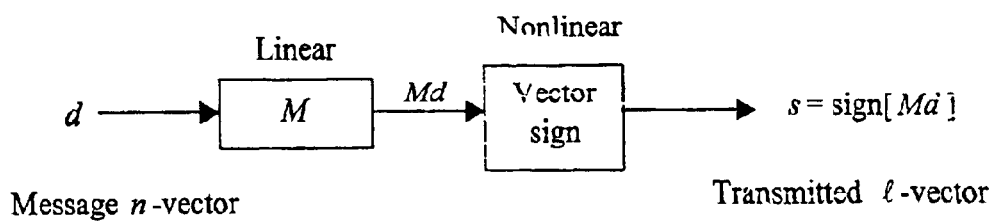
FIG. 6 depicts Majority Logic Coding using a Hadamard sub-matrix M according to an embodiment of the present invention.

Majority Logic Coding: In conventional majority logic coding using square block (nonlinear) codes, the Hadamard matrices H(4), or H(8), are reduced in size by 1, by a deletion of the first row and first column, consisting of only elements $\{+1\}$. This achieves square majority logic coding matrices, denoted M(3) or M(7). Thus, the deletion serves to permit a clear majority voting, possible only for the case of odd numbers, and not for the case of even numbers, as in the set N. Then Majority Logic Coding using M(7) (or M(3)) encodes a 7-vector (or 3-vector) d as $$s=\text{sign}(Md), \tag{1.11}$$

using the sign operation of (1.5). The result is a ternary vector, rather than binary vector. The coding situation is depicted in FIG. 6. The decoding is done by the operation $\hat{d}=\text{sign}(M'(s+\text{noise}))$. The term (s+noise) is the received signal vector with additive noise.

The $i^{th}$ receiver with the code word $m_i^c$, being the $i^{th}$ row of M decodes as $$\hat{d}=\text{sign}(m_i^{c'}(s+\text{noise})). \tag{1.12}$$

Figure 7:
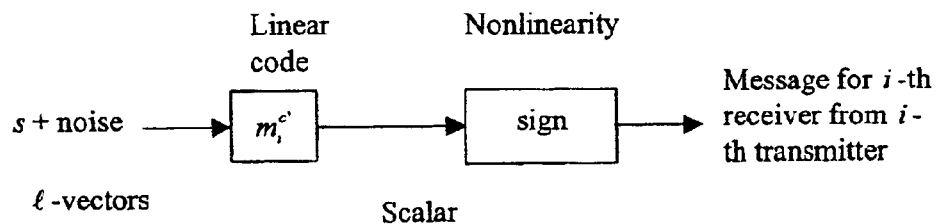
FIG. 7 depicts a Majority Logic decoding scheme for decoding of the it message received from the $i^{th}$ transmitter according to an embodiment of the present invention.

The decoding situation is depicted in FIG. 7. The PAP is unity.

There is a variation to Majority Logic Coding, where certain rectangular codes (l×n)−matrices M(l,n) are used for l>n. For example, with n=7, the codes M(n×2n)=[M(n)|+M(n)] and M(n×2n)=[M(n)|−M(n)] have been tested to achieve improved error correction. Also, the majority logic codes of length $1 \geq 2^n-1$, noted already, are simply n arbitrary column selections from a Hadamard matrix of size $2^n$, or with one row deleted.

II. Go-CDMA Technology Overview

Go-CDMA technology is suited for implementation in CDMA communication systems. Go-CDMA coding is nonlinear, multi-stage coding for application in a hub station transmitter. Go-CDMA decoding in the receiver involves the inverse process. The Go-CDMA multi-stage codes are constructed from the interconnection of proposed Go-CDMA nonlinear, building-block codes. These in turn are constructed from Go-CDMA matrices, satisfying a proposed Go-CDMA matrix defining property. These constraints ensure attractive error correction properties for the system under partial loading conditions. In this subsection, a qualitative overview is presented and in the next subsection, more precise mathematical descriptions of the technology according to embodiments of the present invention are given.

Building-block Go-CDMA codes: The Go-CDMA building-block codes are rectangular nonlinear codes, constructed from rectangular Go-CDMA matrices satisfying Go-CDMA matrix defining properties. The matrices are extracted from the rows and columns of orthogonal Hadamard matrices. The coding requires linear integer arithmetic operations on the data using these matrices and certain sign, sgn, Sgn or integer rounding nonlinear operations. The sign operation is as defined in (1.5) while the sgn and Sgn operations are defined in (1.6) and (1.18), respectively.

Consider first the case of a simple one-block l×n-Go-CDMA code. This is for $A \leq n$ active users transmitting binary data in frames of $l = \alpha n \geq n$ chips, giving a frame expansion factor of $\alpha = (l/n) \geq 1$. The coding involves linear block coding of polar ternary vectors, which include the message data, followed by a quantization operation, such as a sgn operation, or when used in a multistage coding a variation of this operation termed here a Sgn operation. This yields multi-level data for transmission. After the transmission of this data, the first stage of decoding involves linear block decoding of the multi-level data, followed by a sgn operation to recover the binary message data estimates.

The incoming vector information, without loss of generality, has elements in the ternary set $\{-1, 0, +1\}$. The $i^{th}$ user data is in the $i^{th}$ element of the message vector. If the user is active, then the data is polar-binary data with elements in the set $\{-1, +1\}$ and if the user is inactive, then the data is simply the set element $\{0\}$. If there is a pause in transmission, a sentinel code is usually transmitted with elements in the set $\{-1, +1\}$. The alternative of transmitting $\{0\}$, can cause noise in reception during a pause.

For the multi-cell communication system situation, by using different codes in different cells, there is some suppression of neighbor cell interference.

Go-CDMA coding, using one building-block code, is free of so-called deterministic errors, irrespective of the number of active user numbers. It corrects errors, diminishing approximately linearly from l/2 for l even, or (l/2)−1 for l odd, in the case A=1. The decrease is to a positive integer in the full loading case A=n. The positive integer is denoted e(l), which also increases as l increases, although not necessarily monotonically, being in the range [2, 7] in building block codes with $n \leq 4$, $1 \leq 16$. Examples of building-block code sizes with these preferred error correction properties are 8×3, 16×5, 12×5, 20×7 and 24×7.

Go-CDMA building-block codes, for specified frame expansion factors, achieve error correction, which increases linearly with the maximum user number n, and is computationally simpler per user as n increases. The upper limit on n is about n=8, or so, since beyond this, the frame expansion factor α necessary to permit satisfaction of the Go-CDMA matrix defining property, becomes too large for application to multi-stage coding.

An increase in higher user numbers in single-stage Go-CDMA coding can be achieved by paralleling Go-CDMA building blocks, preserving error correction within the blocks, but with no possibility for cross block error correction, unless followed by later stages of Go-CDMA coding.

Two-stage Go-CDMA coding: Two-stage coding is a concatenation of two compatible, single-stage, parallel, block-coding stages with suitable interconnections. Preferably, the interconnections are designed to achieve a scaling up of the error correction capability of the building-block codes, or at least as best a scaling up as can be achieved. Such Go-CDMA codes, in the case of identical size building blocks, can be used conveniently for user numbers, being the square of the numbers handled by a single building-block code.

Consider a pair of a×b and c×a Go-CDMA single stage codes where each single-stage code is constructed by parallel connection of $a_1 \times b_1$, and $c_1 \times a_1$ building-block codes. Then in a two-stage interconnection to achieve a c×b code, the goal is to achieve for 1→b users, c/2→e(c) errors corrected. Thus, as the user numbers are squared in a two-stage coding, the goal is that the errors corrected in a frame are also squared.

Figure 8:
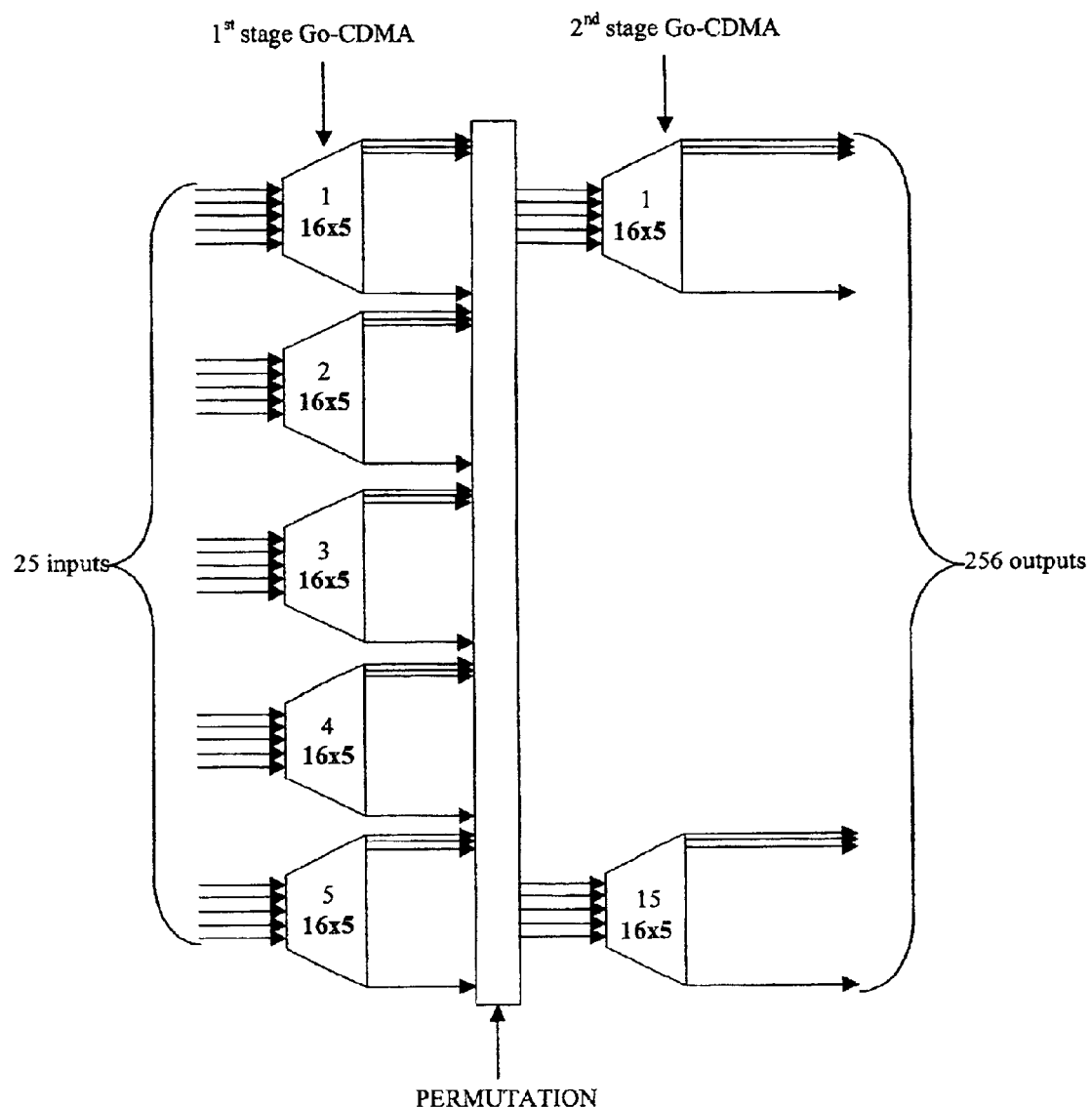
FIG. 8 depicts a two stage Go-CDMA coding (or decoding with arrows reversed) scheme for coding (or decoding) up to 25 active users using 16×5 single-stage Go-CDMA codes according to an embodiment of the present invention.

As an example, consider a 16×5-Go-CDMA single-stage building-block code, for implementing in multi-stage coding. This block has a 5-vector input and 16-vector output. Interconnections of such building blocks may achieve two-stage 256×25-Go-CDMA codes. The interconnection arrangements for this is that there are 5 parallel building blocks driven by a total of 25 inputs in a first stage coding. The five sets of outputs of this first stage, totaling 80 outputs, become inputs to a second set of 16 parallel building blocks giving now 256 outputs. This is depicted in FIG. 8.

The decoding process reverses the flow of information, so that the outputs, after of transmission, become inputs for the decoding blocks. These pass through two stages of single stage decoding to recover the original message, in the absence of transmission channel noise. In reception, each receiver only decodes its assigned information. There are two rules for applying two-stage Go-CDMA coding.

Rule 1: No two outputs from a first-stage building block should become inputs to a single second-stage building block. As long as this rule is obeyed, the connections can be either systematic or pseudo randomized. This rule ensures that there is optimum error correction in the multi-stage coding so that there is a scaling up the error correction capability of a single building-block code.

Rule 2: Within the one communication cell, either the code selection from the set of building-block or nonlinear codes of the same size is derived via a pseudo-randomized selection process from a large set of possible code words. One realization of this is to ensure that the interconnections between the different stages, using standard building blocks, are pseudo randomized. As long as this rule is obeyed, each cell using multi-stage Go-CDMA coding will have a "randomly" different code, so that the inter-cellular interference in the decoding process is reduced by the frame size expansion factor.

The above rules are not compulsory but may be followed to obtain optimal results from a two or more stage Go-CDMA coding scheme. If non-optimal results would suffice, then any invertable permutation operation can be used in a two or more stage Go-CDMA coding scheme.

Figure 9:
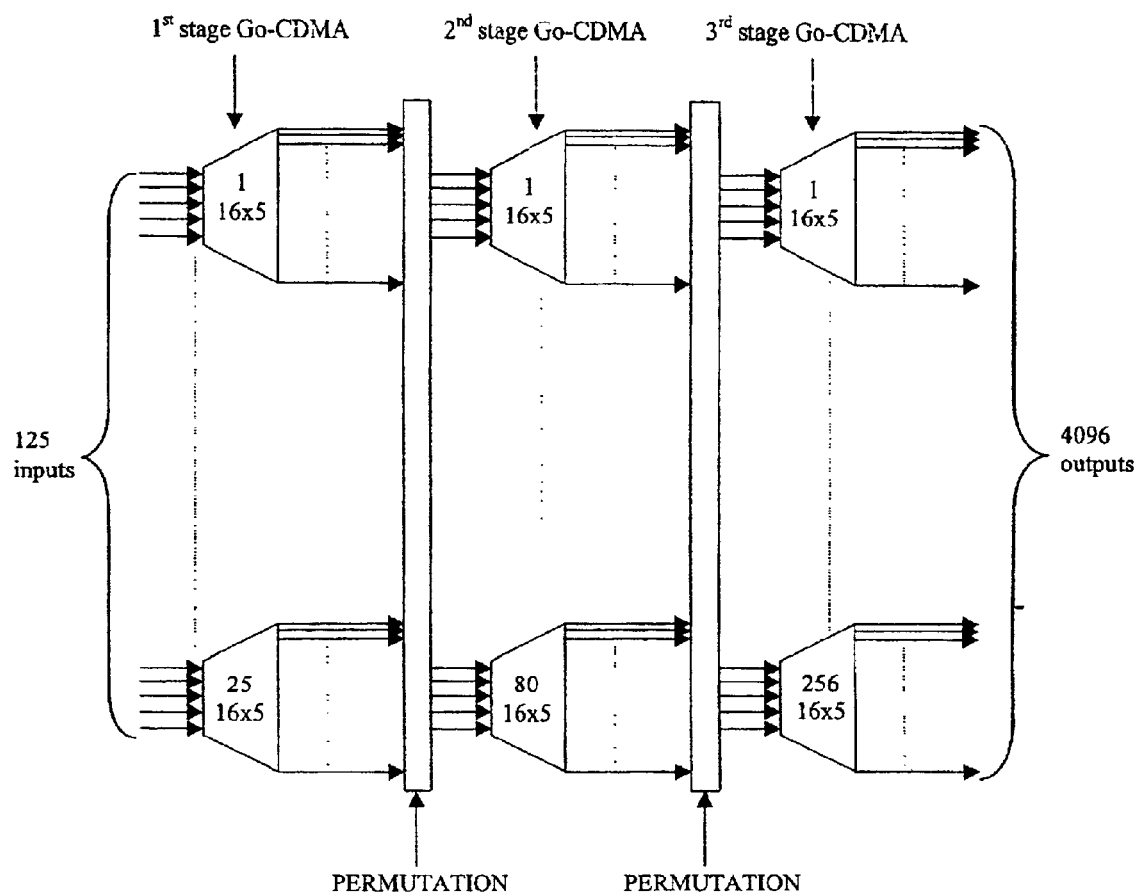
FIG. 9 depicts a three stage Go-CDMA coding scheme for coding (or decoding with arrows reversed) up to 125 active users using 16×5 single-stage Go-CDMA codes according to an embodiment of the present invention.

Multi-stage Go-CDMA coding: Three-stage Go-CDMA coding is a concatenation of three compatible, single-stage codings with suitable interconnections. Each stage is constructed by paralleling suitably sized building block codes. Preferably, the interconnections are designed to achieve a true scaling up of the error correction capability of the building-block codes, and thereby achieve Go-CDMA codes for the cube of the user numbers that can be handled by a single building block code, at least in the cases when all building blocks are identical. Consider a×b, c×a, f×c Go-CDMA single stage codes. Then in a three-stage interconnection to achieve an f×b code, the goal is to achieve for 1→b users, f/2→e(f) errors corrected. This is illustrated in FIG. 9.

Figure 10:
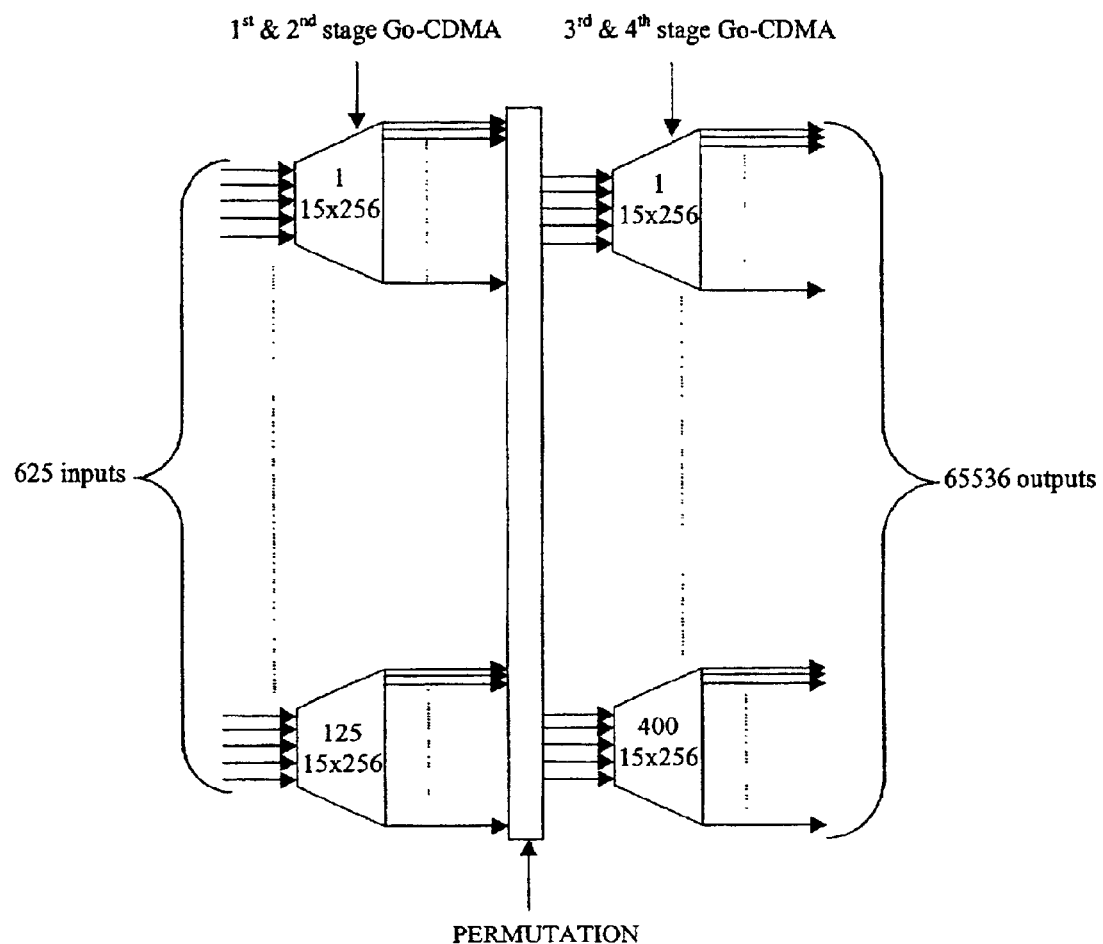
FIG. 10 depicts a four stage Go-CDMA coding scheme for coding (or decoding with arrows reversed) up to 625 active users using 16×5 single-stage Go-CDMA codes according to an embodiment of the present invention.

Four-stage Go-CDMA coding is an extension of the two-stage and three-stage Go-CDMA coding approach. This can effectively raise the building block size by a power of 4, scaling up the error correction properties accordingly. Four-stage Go-CDMA coding can be implemented as two nested two-stage codes. This is illustrated in FIG. 10.

By working with rectangular block codes resulting in different extended frame sizes, the users may be permitted different classes or quality of service. Some data could be more important than others for accurate transmission, so this user data can be assigned extended length codes.

In multi-cell wireless applications, selection of the frame expansion factor of typically, $\alpha=64$ or higher, would be needed to give significantly "better" neighboring cell interference suppression than frequency planning.

Alternative Go-CDMA realizations: In alternate embodiments of the invention, larger if building-block Go-CDMA codes are readily designed, which satisfy mildly relaxed Go-CDMA matrix defining properties. They have reduced error correction capability, and also introduce deterministic errors for some partial loadings, unless something is done to prevent this. If such codes are used, pseudo-data, perhaps just {+1}, may be generated and substituted for a possible small subset of inactive users prior to coding and transmission. This subset number is chosen to maximize the error correction. Such pseudo data can be used also to ensure an odd number of active users so that binary signals are transmitted, as in traditional majority logic coding, or to eliminate deterministic errors which arise for certain user numbers and using certain "less preferred" codes. Thus we may consider the case of n users, including both A active users and certain inactive users becoming pseudo-active, and the remaining users inactive. One example of a code requiring such pseudo active-user data to eliminate deterministic errors, is a 512×20 code.

With a full complement of pseudo-active users, as required if calculating with using exclusive-OR operations, there is an effective conversion of the raw data set of ternary elements in the set {−1, 0, +1}, with zero indicating an inactive use, to the polar binary set {−1, +1}. FIG. 11 depicts the assembly of user data, including active user data, pseudo-active user data and inactive user data into an n-vector d.

When user number limits n, are prescribed apriori to be outside the sets of the integer powers of the integers . . . 3,4,5,6,7,8 . . . , there are suitable realizations, but perhaps less preferred because they appear unnecessarily complicated. One performs a multi-stage Go-CDMA coding using different code sizes in each stage, another includes inactive users to pad the numbers up to some n belonging to one of the preferred.

Error correction: For a building-block n×l Go-CDMA code, the underlying minimum distance (Hamming distance) between the Go-CDMA matrix columns is typically in the range [2, (l+1)/2] and for the rows, 2, at least for a n>3. Other measures are the singular values, or eigenvalues, of the Go-CDMA code matrix. These measures are invariant of the ordering of the rows and columns. Working with Go-CDMA matrices that achieve a maximum Hamming column distance close to (l+1)/2, and the minimum ratio of maximum-to-minimum singular value (close to unity) gives good error correction properties. As an example of error correction, for a particular 16×4 Go-CDMA code, there is a correction of 2 bit errors at full loading, increasing to 7 bit errors with A=1 active users. In multi-stage coding, the goal is to effectively scale up these error correction figures.

When there is less than full channel occupancy, the Go-CDMA coding is such that there is correction of some of the errors introduced by channel noise. Larger lengths l of code words, by factors of 2,4,8, . . . can always be used to achieve greater channel error correction, and to reduce the relative strength of neighbor cell interference, but at a loss in capacity. Without neighboring cells, there is perhaps some incentive to have frame expansion factors of greater than unity. However, with neighboring cell interference, and in the absence of frequency planning, there is an imperative to have expansion factors of at least 40 to compete with TDMA which uses frequency planning.

In practical applications, as the allowable user number n increases in a communication cell, there is less chance of fall or high levels of occupancy, and more error correction. Code allocation across cells in a cluster of cells also decreases high occupancy levels and increases error correction. Go-CDMA has the potential to cope with larger user numbers per cell than CDMA.

Computational Effort: Single stage Go-CDMA coding and decoding have simplicity of implementation in that computational effort for single-stage, building block codes is of the same order as that for current linear block coding schemes of the same size, and upgrading is primarily a software or firmware change to change the linear codes and additional mathematical operations. For example, quantization operations, typically sgn operations, and integer rounding operations may be included to implement the Go-CDMA coding. Multi-stage Go-CDMA coding is likewise not really any more expensive than CDMA coding, although its decoding requires up to an order of magnitude computational effort increase for the user.

Majority Logic Coding goal: Go-CDMA achieves the goal of Majority Logic Codes by departing sufficiently from conventional Majority Logic Coding approaches to make it useful. The applicants have, for example, developed the "complete" set of Majority Logic Codes, which introduce no deterministic errors, at least for the case of realistic frame expansion factors. This set is relatively sparse. The applicants have also generated a set of Go-CDMA codes which introduce no deterministic errors with all users active, but otherwise may introduce errors. These sets of codes include the earlier studied incomplete set of codes for n=3, n=7, and the codes with word length $l \geq 2^n - 1$. To compete with present day CDMA and TDMA, codes of order 256 are desirable. Such codes are available as Go-CDMA codes. To compete with TDMA in terms of inter-cell interference, Go-CDMA codes having frame expansion factors a $\alpha \geq 64$ are preferable.

III. Go-CDMA Matrices, Coding, Decoding and Preferred Embodiments

The Go-CDMA matrix property is defined below in various ways including through the use of equations and accompanying description. These definitions are used to specify what matrices are considered Go-CDMA matrices herein. Codes that comprise of rows and/or columns of the Go-CDMA matrices are considered Go-CDMA codes. Consider an a×b-matrix M(a,b), or denoted M, with a≧b, and having real finite elements. Consider also data b-vectors d, with elements $d_i$ in the ternary set $\{-1, 0, +1\}$. Then this is denoted a Go-CDMA matrix if, $$d_i = \text{sgn}(m_i^{c'} Q_k(Md)) \text{ for all } i \in \{i | d_i \in \{-1, +1\}\}, \quad (1.13)$$

or, in the case that k=1, $$d_i = \text{sgn}(m_i^{c'} \text{sgn}(Md)) \text{ for all } i \in \{i | d_i \in \{-1, +1\}\}, \quad (1.14),$$

where $m_i^c$ is the $i^{th}$ column of M. In the above defining equation, there is a quantization operation $Q_k(.)$. This is a standard operation that converts an input integer in the set [−a,+a] to an output belonging to the set [−k,−1]& [+1,+k] for some integer k≦a. The conversion formula allows arbitrary mappings, but these must be specified. For example, the integer space can be "halved" in that input integers in the range [−2k,2k] could map into the above set by first halving each integer, and using an integer rounding operation. Thus in obvious notation, apply round(Md/2). Here round(r)=sgn (r), for −1≦r≦1. Multiple "halvings" can also be used easily. Also, integers in the set [−qk,qk] where q is an integer, can be mapped into the desired set by first dividing each integer by q followed by a rounding operation. Note that sgn (.)=$Q_1$(.). Also, note that if k=a, then $Q_a$(Md)=Md, and the operation is trivial and linear for Md≠0.

Any code matrices which can satisfy the operations defined in (1.13) and/or (1.14) is considered Go-CDMA codes herein.

One-stage Go-CDMA coding: One stage of Go-CDMA coding using a Go-CDMA code matrix M is, $$s = Q_k(Md), \quad (1.15)$$

where s is the transmitted signal a-vector, in general ternary, and the sgn and quantization operations are as in the Go-CDMA matrix defining property. The signal s is (2k)-ary. With k=1, $Q_1$(Md)=sgn(Md), and s is ternary.

One-stage Go-CDMA decoding: The corresponding Go-CDMA decoding stage is $$\hat{d} = \text{sgn}(M'r), \quad (1.16)$$

where r is the received signal after transmission and is thus s+noise, where the notation noise stands for additive transmission channel noise.

Consider Go-CDMA matrices $M=M_1(a,b)$, $M_2=M_2(c,a)$. Then we can define a two-stage Go-CDMA coding as the application of a single stage Go-CDMA coding, followed by a second single stage Go-CDMA coding.

Two-stage Go-CDMA coding: For Go-CDMA matrices $M_1=M_1(a,b)$, satisfying (1.14) and $M_2=M_2(c,a)$, satisfying (1.13), and a permutation matrix P, two stage of Go-CDMA coding is, $$s = Q_k(M_2 P \text{ Sgn}(M_1 d)), \quad (1.17)$$

where s is the transmitted signal c-vector, which is ternary or (2k+1)-ary. Notice that the quantizer is only applicable in the second stage. Also, with k=1, $Q_1$(Md)=sgn(Md), and s is ternary. Notice also that instead of a sgn operation on the vector $M_1$d, a modification is used, denoted Sgn defined as follows:

$$Sgn(x) = \begin{cases} sgn(x) & \text{if } x \neq 0 \\ 0 & \text{if } x = 0 \end{cases} \quad (1.18)$$

where x is a vector.

Two-stage Go-CDMA decoding: The corresponding Go-CDMA decoding stage is, $$\hat{d} = \text{sgn}(M_1' P' \text{sgn}(M_2' r)). \quad (1.19)$$

Three-stage Go-CDMA coding: Three-stage Go-CDMA coding using Go-CDMA matrices $M_1$, $M_2$, satisfying (1.14), and $M_3$ satisfying (1.14) or (1.13), and permutations $P_1$, $P_2$ of appropriate dimensions is, $$s = Q_k(M_3 P_2 \text{ Sgn}(M_2 P_1 \text{ Sgn}(M_1 d))), \quad (1.20)$$

where s is the transmitted signal c-vector, and k is some integer satisfying k≧1. The quantizer is only applicable in the last stage.

Three-stage Go-CDMA decoding: The corresponding Go-CDMA decoding stage is, $$\hat{d} \text{sgn}(M_1' P_1' \text{ sgn}(M_2' P_2' \text{sgn}(M_3' r))), \quad (1.21)$$

Multi-stage Go-CDMA coding and decoding: For four stage and a higher number of stages, the same pattern for generalization follows that now established.

The Go-CDMA matrix property ensures that there are no deterministic errors for any active users A≦n in the nonlinear coding and decoding processes. There may be errors for inactive users when $d_i \in \{0\}$, but there is no destination for such errors.

"Soft Decision" Go-CDMA Detection in Multistage Decoding

Another embodiment of Go-CDMA decoding includes the use of "soft decision" based detection for Go-CDMA decoding other than in a last stage decoding block. "Soft decision" based detection algorithms may provide an approximately a 2 dB signal gain over "hard decision" based detection algorithms in intermediate Go-CDMA decoding stages.

For example, for earlier (1.19) two-stage Go-CDMA decoding, the "soft decision" decoding has the structure $$\hat{d} = \text{sgn}(M_1' P'(M_2' r)). \quad (1.22)$$

For the earlier (1.21) three-stage Go-CDMA decoding, the "soft decision" decoding has the structure $$\hat{d} = \text{sgn}(M_1' P_1'(M_2' P_2'(M_3' r))),. \quad (1.23)$$

And for four stage and a higher number of stages, the same pattern for generalization follows that now established.

"Soft decision" Go-CDMA detection effectively retains all information from the detection in the earlier stages until the very last stage, giving the multi-stage receiver a better signal reception than is possible with a "hard decision" based intermediate detection.

Go-CDMA matrices M(a,b) as signed permutation matrices: One class of Go-CDMA matrices according to an embodiment of the present invention is the class of signed permutation matrices. A signed permutation matrix has all elements zero, save that in each row and column there is one, and only one, element belonging to the set $\{-1, +1\}$.

Go-CDMA matrices M(a,b) from Hadamard matrix columns: In Table 1, there are listed Go-CDMA code matrices M(a,b) consisting of certain b columns of the Hadamard matrix H(n) and extracting the a rows. Such Go-CDMA matrices partially inherit the Hamming distance properties, depending on how many rows and columns are preserved, and the particular selections. Note also the errors corrected at full loading e in Table 1.

Go-CDMA matrices M(a,b) as block-diagonal Hadamard sub-matrices: If $M_i(a_i,b_i)$ are Go-CDMA matrices for all $i \in \{1,2,\ldots,q\}$, then the block diagonal matrix $$M(a,b) = \text{block diag}\{M_1(a_1,b_1), M_2(a_2,b_2), \ldots, M_q(a_q,b_q)\}, \quad (1.24)$$

is also a Go-CDMA matrix, where $a_1+a_2+\ldots+a_q=a$, $b_1+b_2+\ldots+b_q=b$. Of course, the simplest case is when the $a_i$ are all equal to $a_1$, and the $b_i$ equal to $b_1$. A special case then is if $q=a_1$, so that $M(a,b)=M(a_1^2,ab)$.

Go-CDMA augmented matrices M(a,b): If $M_i(a_i,b)$ are Go-CDMA matrices for all $i \in \{1,2,\ldots,q\}$, then the augmented matrix $$M(a,b) = [M_1(a_1,b)', M_2(a_2,b)', \ldots, M_q(a_q,b)']', \quad (1.25)$$

is also a Go-CDMA matrix. Of course, the simplest case is when the $M_i(a_i,b)$ are all equal.

Class of Go-CDMA code matrices: There is a class of codes $M_{class}(a,b)$ satisfying the Go-CDMA matrix property above, constructed from one such code M(a,b), by all possible re-ordering of rows and columns of M(a,b) and all possible column and row sign changes. That is $$M_{class}(a,b) = \quad (1.26)$$
$$\left\{ (P(a)M(a,b))P(b)' \;\middle|\; \begin{array}{l} P(m) \text{ is the set of all signed} \\ m \times m \text{ permutation matrices} \end{array} \right\}.$$

Defining the code words of M(a,b) as the columns of M(a,b), together with the columns of −M(a,b). The complete set $M_{class}(a,b)$ can be constructed by all possible ordered k code word selections from this set of code words, save that if one code word is selected, then its negative is excluded. There are $2^b b!$ distinct member codes: For b=4, this number is 16×24=384, and for b=8, this number is (256)×(40,320)= 10,321,920. This complete set $M_{class}(a,b)$ is valid as Go-CDMA code matrices if the sign operation is used. Otherwise, when either the sgn, Sgn or quantization operation is used, only a subset of this complete set holds true for the Go-CDMA coding scheme.

The table below represents a subset of Go-CDMA codes that have been illustratively chosen based on a particular Hadamard sequence implemented on an arbitrary coding platform.

TABLE 1

Go-CDMA matrices M(a,b) from the rows and columns of H(n).

| n | Rows a | Columns b | Errors Corrected e | Columns preserved in H(n) |
|---|---|---|---|---|
| 32 | 2 to 6, 9, 11, 13, 16, 17, 20, 21, 23, 24, 27, 29, 30, 32 | ≤5 | 1 | 8, 15, 21, 25, 28 |
| 16 | 1 to 16 | ≤5 | 2 | 2, 7, 12, 15, 16 |
| 12 | 1 to 12 | ≤6 | 0 | 2, 5, 7, 8, 9, 10 |
| 8 | 1 to 8 | ≤3 | 1 | 1, 3, 7 |

Go-CDMA coding-decoding from one basic code matrix M according to a preferred embodiment of the invention: Consider a Go-CDMA code matrix $M(a,b) \in M_{class}(a,b)$ constructed from a Hadamard matrix H. Then construct a Go-CDMA building-block code from this matrix. In turn construct a two-stage, three-stage, or four-stage Go-CDMA coding block using the one building block. Form block diagonal matrices from M(a,b) as $M(a^2,ab)$, $M(ab,b^2)$ ready for two-stage coding and decoding. Or $M(a^3,a^2b)$, $M(a^2b,ab)$, $M(ab,b^3)$, for three-stage coding and decoding. Or from $M(a^4,a^3b)$, $M(a^3b,a^2b^2)$, $M(a^2b^2,ab^3)$, $M(ab^3,b^4)$ ready for four-stage coding and decoding.

The selection of M(a,b) from $M_{class}(a,b)$ for each diagonal block are the same for all users in a cell, but are pseudo-randomized across cells is to ensure interference reduction from neighboring communication cells transmitting in the same frequency spectrum.

Between each stage of coding (and decoding) and the next stage, there may be a "mezzanine" stage, which is a permutation operation using a P matrix on the outputs of the each stage to re-order the outputs for inputting to the next stage. Thus in a two stage scheme, for the coding process the columns of an a×b matrix are formed by the vector outputs of each first stage coding, and the rows of the matrix extracted and concatenated to form one row vector. Of course in the decoding process, the inverse permutation matrix is used. That is, the vector inputs become rows of a matrix from which columns are extracted in order to form the vector outputs.

Best stage number, user-number limits and frame expansion factor: The most widely applicable multi-stage Go-CDMA coding for larger user numbers, less than 64, is two-stage coding. For larger user numbers, three-stage coding may go to 512 users, and four stages may be implemented to go higher. One-stage coding is limited in its error correction capability, but can be used for any user number limits. For n-user code-division multiplexing applied to mobile communications, there is an elegance in the user number limits n being either 64, 512, 625, 1296, or other squares, cubes or fourth powers of integers up to 8. Compare this to the current conventional CDMA usage of 64, 128 and 256.

The Go-CDMA technology holds out improved performance as n increases. Therefore, according to one embodiment of the invention, n should be maximized subject to other system design constraints.

The best frame expansion factor α depends on the expected level of neighbor cell interference. With zero such interference, as in frequency planning, it may be best to take a small factor given by minimum-length code words. Otherwise, to compete with TDMA and frequency planning, code word length may be increased to achieve desired factors of typically above 40. Examples are selected to achieve minimum α of less than 128, but higher factors are readily obtained by working with a higher a value in the selected building block matrices M(a,b), for a specified b. Also, one can work with higher order Hadamard matrices, or by building composite Go-CDMA matrices.

Pre-coding and post-decoding of signals: To improve transmission bit error rates in high channel noise, as in all communication systems for such channels, there are advantages in applying conventional pre-coding and post-decoding of signals.

Alternative embodiments for carrying out the invention: A generalization of the Go-CDMA matrix defining property (1.13) is to allow W-ary data in the data vector d, for W>3, and to use an appropriate quantization operation in a generalized defining property. This may be less preferred in the current applications environment because the complexity may be unwarranted for applications currently envisaged. However, it does allow the Go-CDMA coding and decoding to generalize all its sgn operations to quantization operations to give further options.

Replacing the sgn or Sgn operations with sign operations in the Go-CDMA matrix defining property, except at the last decoding stage, is an alternative. In this case, care must be exercised in second or later stage coding, since zero-element input data no longer represent inactive users, so that such zero elements do not introduce errors.

Another embodiment which is a compromise is to relax the Go-CDMA code matrix requirement. Consider an a×b matrix M, or M(a,b), and data n-vectors d, with elements $d_i$ in the binary set $\{-1, +1\}$, then choose matrices that satisfy: d=sgn(M'sgn(Md)) for all d. Now there are no deterministic errors when all users are active, but there can be errors otherwise. Thus, there is a need to add pseudo-active users when necessary to achieve no deterministic errors. Useful specific codes, derived from Hadamard matrices H(a) are listed in Table 2, if such a compromise is considered seriously:

TABLE 2

Go-CDMA matrices M (a,b) with relaxed constraints. Here a = $2^m$.

| m | a | b | Preserved columns in H($2^m$) |
|---|---|---|---|
| 4 | 16 | 9 | 1 to 5, 7, 9, 10, 13 |
| 4 | 16 | 10 | 1 to 5, 7, 9, 10, 13, 16 |
| 5 | 32 | 11 | 1 to 11 |
| 5 | 32 | 12 | 1 to 11, 17 |
| 6 | 64 | 13 | 1 to 12, 17 |
| 6 | 64 | 14 | 1 to 12, 17, 33 |
| 7 | 128 | 15 | 1 to 13, 17, 33 |
| 7 | 128 | 16 | 1 to 13, 17, 33, 65 |
| 8 | 256 | 17 | 1 to 14, 17, 33, 65 |
| 8 | 256 | 18 | 1 to 14, 17, 33, 65, 129 |
| 9 | 512 | 19 | 1 to 15, 17, 33, 65, 129 |
| 9 | 512 | 20 | 1 to 15, 17, 33, 65, 129, 257 |
| 10 | 1024 | 21 | 1 to 15, 17, 33, 65, 129, 257, 513 |
| 10 | 1024 | 22 | 1 to 17, 33, 65, 129, 257, 513 |

The pattern above enables the ready extension of these results to higher b values. Another option is to achieve additional frame expansion by conventional post-pseudo-random-CDMA coding along with pre-pseudo-random-CDMA decoding.

Other embodiments may use alternative sign function operations, or exclusive-OR operations in the Go-CDMA coding context to achieve effectively the same or similar properties.

Other embodiments may use one or more stages of the Go-CDMA multiple access scheme in combination with other multiple access schemes to multiplex and demultiplex a multitude of data streams from the same user or from a multitude of different users both in a mobile unit and at the base station. In this embodiment, the use of the invention is not in parallel with the other multiple access scheme(s) but is in combination with the other multiple access scheme(s). A simple example of this would be where the Go-CDMA scheme is used to multiplex the coded signals from an array of CDMA multiplexers in order to attain the desired properties of a Go-CDMA coded signal which has a constant envelope and close to unity PAP. Other variations in the positioning of one or more of the Go-CDMA blocks within such a combination do exists and are also within the scope of Go-CDMA coding/decoding claimed embodiments of this invention.

Other embodiments may use different sign, sgn and Sgn operations in different Go-CDMA coding and decoding blocks in a single stage or multi-stage Go-CDMA implementation. The uses of this embodiment in parallel with and in combination with other multiple access schemes are also within the scope of Go-CDMA coding/decoding.

Still other embodiments of the invention include the use of different implementations of the Go-CDMA coding and decoding process in different Go-CDMA coding and decoding blocks in a single stage or multi-stage Go-CDMA system. These different implementations include table lookups, code mapping, logic operations and other digital signal processing techniques which achieve the same goals of the sign, sgn and Sgn operations in Go-CDMA. The use of these different implementations can be in place of or together with the sign, sgn and Sgn operations a Go-CDMA system.

Still other embodiments of the invention exploit the flexibility allowed in the operation of single and multi-stage Go-CDMA schemes. Take the example of a two stage Go-CDMA scheme as depicted in FIG. 8. In this scheme, a multitude of data rates may be given to a particular user or data stream in the system. If a user or data stream in this scheme is required to transmit at a higher rate than the basic minimum rate, this can be accommodated by giving that user or data stream more than one input channel at the first stage Go-CDMA and/or allowing that user or data stream to bypass the first stage all together. In FIG. 8, any one input at the second stage Go-CDMA has a rate of 16/5 times the rate of a single input to the first stage Go-CDMA scheme. Obviously for a single stage Go-CDMA system, only the flexibility of allocating more than one input channel is available. In the decoding process, any alterations to the coding operations of Go-CDMA will be reversed accordingly. This embodiment allows Go-CDMA to support a multitude of data rates for different data messages in a communication system. Another application of this type of embodiment is in the support of different quality of service by the Go-CDMA scheme. To achieve this, the same flexible approaches in this embodiment can be taken. Instead of sending data at a higher rate, the additional bandwidth may be used for better error protection coding of the data messages so that a better quality of service is achieved.

FIG. 12 depicts a method of coding signals using Go-CDMA codes for transmission within a CDMA system. Referring to FIG. 12, in step 400, the multiple data messages enter a coder. The data messages typically have been pre-processed or pre coded to include error correction or protection bits. The data messages may be received from a processor or other hardware within a CDMA device or a software routine. The coder may be implemented in hardware or software that is the same as or distinct from the hardware and/or software that produced the data messages as illustrated and described with reference to FIG. 3A.

In step 410, psuedo active user data is optionally inserted as a data message into the data message stream for coding. This step may be performed at the illustrated point in the process or may be performed prior to step 400 by a processor or in steps 430 or 440. This step may be performed when desirable depending on the number of active users within a system, the total number of permitted users and the Go-CDMA codes chosen in order to prevent deterministic errors within the CDMA system.

Step 420 determines the coder implementation. Step 420 need not be an actual processing step within a Go-CDMA coder implementation. If the coder is implemented as a single stage coder, then step 430 begins. If the coder is implemented as a multi-stage coder then step 440 begins.

In step 430, the coder codes the received data messages, and any pseudo active data messages, based on Go-CDMA codes. The coding may be performed, for example, according to equation (1.15). The coded data is then made available for modulation in step 450. In step 440, the coder codes the received data messages, and any pseudo active data messages, based on Go-CDMA codes and multi-stage techniques. The coding may optionally include inserting pseudo-randomized connections between stages. When two stage coding is implemented, equation (1.17), for example, may be used. When three stage coding is implemented, equation (1.20), for example, may be used. When more than three stage coding is implemented, the equation that is implemented may be extrapolated based on the pattern established among the equations for one, two and three stage coding.

In step 450, the data messages encoded based on the Go-CDMA codes is channel modulated. Then in step 460, the modulated signal is transmitted over a communications channel. In the context of a base station transmitter, the data messages that are fed into the coder may be multiplexed data message streams corresponding to many active users and the communications channel is generally air. In the context of a mobile unit transmitter, the data messages that are fed into the coder may be for a single data message stream or a few message streams. When the coder implements the optional pseudo-randomized connections, the transmitter may also transmit pseudo-randomized connection data regarding the pseudo-randomized connection scheme to decoders to facilitate decoding. The pseudo-randomized connection data may be data that characterizes the scheme or data that identifies it to a remote device that includes multiple stored pseudo-randomized connection schemes stored in memory.

FIG. 13 depicts a method of decoding signals using Go-CDMA codes received within a CDMA system. Referring to FIG. 12, in step 500 a receiver receives a composite CDMA signal from a communication channel. In step 510, a demodulator demodulates the composite signal to recover multiplexed data messages and coveys the multiplexed data messages to the Go-CDMA code based decoder.

Step 520 determines the decoder implementation. Step 520 need not be an actual processing step within a Go-CDMA decoder implementation. If the decoder is implemented as a single stage decoder, then step 530 begins. If the decoder is implemented as a multi-stage decoder then step 540 begins.

In step 530, single stage decoding is used to decode one or more data streams based on Go-CDMA codes. The decoding may be implemented, for example, according to equation (1.16). The decoded data is then made available to a post decode or other unit for further processing in step 560.

In step 540, when pseudo-randomized connections are optionally used during the coding process, the decoder is configured to have the corresponding pseudo-randomized connections necessary to decode the signal. This pseudo-randomized connections within the multi-stage decoder may be configured based on pseudo-randomized configuration data received from the transmitter within the CDMA system and/or based on pseudo-randomized configuration data stored in memory.

In step 550, multi-stage decoding is used to decode one or more data streams based on Go-CDMA codes. When two stage decoding is implemented, equation (1.19) or (1.22), for example, may be used. When three stage decoding is implemented, equation (1.21) or (1.23), for example, may be used. When more than three stage decoding is implemented, the equation that is implemented may be extrapolated based on the pattern established among the equations for one, two and three stage decoding. The decoded data is then made available to a post decode or other unit for further processing in step 560.

In step 560, the decoded data is received for further processing which may include error correction based on error correction codes within the decoded data messages.

FIG. 14 depicts an illustrative method of generating Go-CDMA codes according to an embodiment of the present invention. Referring to FIG. 14, in step 600, n codes of length l are selected. In step 610, it is determined whether the codes satisfy equation (1.13) or (1.14). If not, then step 600 is repeated. If so, then in step 620 the codes are stored as Go-CDMA codes. It may be convenient to qualify n×l blocks at the same time, or portions thereof. Notwithstanding the foregoing, larger or smaller blocks may be qualified at the same, particularly in the case of multi-stage coding and decoding, and the steps of FIG. 14 are merely meant to be illustrative of a technique for generating codes. The processes for using Go-CDMA codes, in general, do not depend on the generation method.

FIG. 15A depicts a functional block diagram of another embodiment of a Go-CDMA system 300, 310 used in mobile communications. Referring to FIG. 15A, the system incorporates a random code masking/scrambling block 365 between a Go-CDMA coding block 210 and the modulation/demodulation block 320. Similarly, the system incorporates a random code demasking/descrambling block 368 between a Go-CDMA decoding block 220 and the modulation/demodulation block 320. The system may be a mobile unit 310 or a base station 300 and may be used to encode and decode in one or both of the forward and reverse directions between a mobile unit and a base station.

The random code masking/scrambling block 365 may be used to scramble Go-CDMA codes generated in the coding block in a random, but known, fashion. The scrambling may be performed, for example, by multiplying coded bits from the Go-CDMA coding block 210 by a random code. In general, the scrambling may be performed in a bit-wise fashion so that a logical operation is performed on each bit of the coded data by a corresponding bit of a random code within a random code sequence. Preferably the random code sequence has a long periodic cycle so that in any one communication session, or over many communication sessions, the random codes appear random. As an alternative to multiplying, the scrambling may be performed by any logical operation on the coded bits and the random code including an exclusive OR operation or other logical operations including combinations of AND, OR, NAND, NOR, XOR and XNOR operations.

After the random code masking/scrambling of the coded data messages, the scrambled data is provided to the modulation/demodulation unit 320 for transmission to one or more receiving systems. In the case of mobile communications systems, transmission occurs over a wireless medium which may include, for example, a space or air medium. The transmitted data of each user may appear like random noise (but with more than an ambient power level) to systems receiving transmitted data from the wireless medium. This may lower the magnitude of interference among multiple-users of the same communications channel (such as the wireless medium between a plurality of mobile units and the corresponding base station with which they communicate).

In the reverse direction, a receiver may descramble the coded data based on information identifying the random code masking scheme employed by each user. The identifying information may be transmitted over a pilot or control channel to the receiving system. Alternatively, the identifying information may be communicated as part of an encode data message or may otherwise be provided to the receiving system for descrambling purposes. The identifying information may be used not only to decode the random codes introduced prior to signal transmission, but also to identify a signal as a Go-CDMA signal.

The received signal is demodulated in the modulation/demodulation unit 320. It is then applied to the random code demasking/descrambling block 368. When the demasking/descrambling block includes the correct identifying information for the random codes, it descrambles the signal using the correct random codes. In general, this is performed by performing a bit-wise logical operation between bits of the received data and corresponding bits from a random code within the sequence of random codes. The logical operation is the reverse of the logical operation used in the random code masking/scrambling block 365. The output is a Go-CDMA coded signal. Subsequently, the Go-CDMA decoding unit 220 may decode the Go-CDMA coded signal to recover the data message or messages (which may still be coded) that were transmitted. The data messages may be provided to a data processing unit 375 for processing the data in a manner similar to that described in FIG. 3A relative to blocks 330–370.

FIG. 15B depicts a communications system which is equipped to handle Go-CDMA coding/decoding and other CDMA coding/decoding techniques. The system depicted in FIG. 15B maybe implemented in a mobile unit 310 or a base station 300. In addition, the system may be configured to simultaneously handle both Go-CDMA coded signals and other CDMA coded signals. This may be desirable to implement, for example, in a base station. A telecommunications service provider may equip the base station with two CDMA signalling formats—Go-CDMA and another format—in order to allow the introduction of Go-CDMA coded signals into an existing network without requiring all other mobile units on the network to conform to the same standard. This provides a mechanism for the introduction of new technology and may allow provision of different classes of service to a community of subscribers. One new technology may be a third generation wireless technology that incorporates Go-CDMA codes and which permits increased and in some embodiments variable bandwidth to be allocated to mobile units.

Alternatively, when implemented on a mobile phone, for example, the Go-CDMA coding 210 and the other coding scheme(s) 380 may not be simultaneously active. Rather, the mobile unit may permit multiple modes of operation, some of which include operation with Go-CMDA coding and some of which do not. This permits using a Go-CDMA equipped phone to operate with networks that do not include base stations with Go-CDMA coding and decoding units, for example, when a user roams outside of a Go-CDMA coverage area. Analog, TDMA, GSM and other technologies may also be included in the mobile unit for roaming off-network.

Referring to FIG. 15B, it will be noted that in base station implementations, both the Go-CDMA coding unit 210 and the coding unit 380 (and the Go-CDMA decoding unit 220 and the decoding unit 385) may be simultaneously active. Therefore, the base station may transmit, over the same channel, data messages encoded using Go-CDMA coding and data messages encoded using other CDMA coding schemes. Similarly, the base station may receive over the same channel data messages encoded using Go-CDMA coding and data messages encoded using other CDMA coding schemes. In the latter scenario, the random code demasking/descrambling block 368 may descramble the signals based on the identification information and the corresponding random codes. The demasking/descrambling block 368 may then apply the descrambled signals to the decoding block 385 or the Go-CDMA decoding block 220 based on the identification information for at least some of the signals. Subsequently, the non-Go-CDMA coded data are decoded by the decoding unit 385 while the Go-CDMA encoded data are decoded by the Go-CDMA decoding unit 220.

By implementing the random code masking/scrambling (and demasking/descrambling), two users of mobile units 310 that are communicating with the same base station 300 may use some or all of the same codes (Go-CDMA or other codes) on the same frequency channel without introducing clashes among signals at the decoding stage. This advantage is more pronounced when using Go-CDMA coding because of the low peak to average power properties of the Go-CDMA coded signal and a more constant power envelope of the Go-CDMA coded signal.

It will be understood that additional coding may be performed in connection with all of the coding schemes described above. For example, signals including Go-CDMA coded signals may be further coded into ternary or a higher order (m-ary) format in amplitude, phase, frequency or combinations thereof.

It will be further understood that the data message streams that are shown entering and exiting the data processing unit 375 may be a single serial stream of data that is divided into parallel data messages to allow the data to be transmitted in parallel over multiple communication channels. Alternatively, the data messages may be parallel data representing related streams of data such as video, voice and color data streams associated with a video telephone call, for example. Alternatively, the data messages may be unrelated parallel data streams such as voice from a voice call and internet web pages. Moreover, the number of data messages that are simultaneously coded for each mobile unit and base station pair may depend at any given time on the bandwidth required by the mobile unit or base station based on the services in use or information that is required to be delivered.

Another advantage of the present invention is evident when many parallel data message streams are encoded and transmitted. By implementing Go-CDMA coding, which has a constant power envelope and a low peak-to-average power, many data streams may be separately encoded and transmitted without requiring a linear power amplifier with a large dynamic range. This helps to keep the cost of high-bandwidth systems implementing Go-CDMA coding lower than the cost of high-bandwidth systems implementing other CDMA coding schemes.

In addition, conventional CDMA systems, including those proposed for third generation CDMA systems, require some data message channels to be used solely for the purpose of correcting peak to average power problems. Therefore, these systems waste bandwidth. Such bandwidth allocations for signal correction are generally not required with Go-CDMA coding because the Go-CDMA coding scheme has a low peak to average power and a constant power envelope which obviates or at least greatly reduces the need to allocate data message channels for signal correction.

It will be further understood that while the random code masking/scrambling and random code demasking/descrambling block have been illustrated as separate functional blocks, these functional blocks may be combined with any or all of the functional blocks depicted in FIGS. 3A, 3B, 15A or 15B and may be implemented as program instructions stored in a memory and executed by a processor.

Another embodiment of the current invention is to use Go-CDMA codes as parallel orthogonal codes in a MC-CDMA coding scheme. Thus for a MC-CDMA coding scheme which uses a Hadamard matrix H, this will be replaced by a Go-CDMA matrix M. This embodiment—termed as Multi Code Go-CDMA (MC-Go-CDMA) benefits from the high tolerance of Go-CDMA codes to non-linear distortion (the sign, sgn and Sgn operations in Go-CDMA coding are the extreme non-linear processes) and code word lengths l not restricted to values of $2^m$. The latter property of this embodiment may allow different spreading factors achievable using MC-Go-CDMA where MC-CDMA cannot. Even with the extreme non-linear operations of sign, sgn and Sgn Go-CDMA codes are still performing without errors thus, MC-Go-CDMA codes subjected to lesser channel non-linearity may perform better than MC-CDMA. The operation of MC-Go-CDMA coding is $$s=M(n)d, \quad (1.27)$$

and, $$d=M'(n)s=M'(n)M(n)d=d. \quad (1.28)$$

While specific embodiments of the present invention have been disclosed, it will be understood by those having ordinary skill in the art that changes may be made to those embodiments without departing from the spirit and scope of the invention. It will be further understood that the mathematical and matrix operations using Go-CDMA codes and matrices may be implemented in hardware or software. In the latter case, software instructions and data may be embodied in a computer useable medium and stored in a memory of a communications device. The software instructions may include control logic which when executed by a processor or other hardware cause the communications device to encode and decode data messages based on the Go-CDMA codes as depicted in FIGS. 4–13 and 15A and B and described above, or to generate Go-CDMA codes as depicted in FIG. 14. When implemented in hardware or firmware, the mathematical and matrix operations using Go-CDMA codes and matrices may be provided by logic on one or more chips or may be burned into, for example, a EEPROM as program instructions and data. It will be farther understood that the Go-CDMA codes and matrices may, for retrieval and use by a system, be stored in a memory, embodied in hardware, received from an external source such as other hardware or memory, or derived or generated from stored data or hardware internal to or external to the system.

What is claimed is:

1. A method for coding a multi-code code division multiple access signal based on Go-CDMA codes, comprising:
   providing a Go-CDMA matrix;
   coding a multi-code data message based on the Go-CDMA matrix; and
   transmitting the coded data message over a communication channel.

2. The method according to claim 1, wherein the coding includes multiplying the data by the Go-CDMA matrix.

3. A method for coding a multi-code code division multiple access signal based on Go-CDMA codes, comprising:
   providing a multi-code coding block for coding based on a Hadamard code;
   replacing the Hadamard code with a Go-CDMA code;
   coding a data message using the multi-code coding block based on the Go-CDMA code; and
   transmitting the coded data message over a communication channel.

4. A method for decoding a multi-code code division multiple access signal based on Go-CDMA codes, comprising:
   providing a Go-CDMA matrix;
   receiving a coded multi-code data message over a communication channel; and
   decoding the data message based on the Go-CDMA matrix.

5. The method according to claim 4, wherein the decoding includes correlating the data message with the Go-CDMA matrix.

6. A method for decoding a multi-code code division multiple access signal based on Go-CDMA codes, comprising:
   providing a multi-code decoding block for decoding based on a Hadamard code;
   replacing the Hadamard code with a Go-CDMA code;
   receiving the coded data message over a communication channel; and
   decoding the data message using the multi-code coding block based on the Go-CDMA code.

7. A computer program product for causing a system to provide a multi-code code division multiple access signal, the computer program product comprising a computer useable medium having computer program logic therein, the computer program logic comprising:
   providing means for causing the system to provide a Go-CDMA matrix;
   coding means for causing the system to code a multi-code data message based on the Go-CDMA matrix; and
   transmitting means for causing the system to transmit the coded data message over a communication channel.

8. The computer program product according to claim 7, wherein the coding means includes means for multiplying the data message by the Go-CDMA matrix.

9. A computer program product for causing a system to provide a multi-code code division multiple access signal, the computer program product comprising a computer useable medium having computer program logic therein, the computer program logic comprising:
   providing means for causing the system to provide a multi-code coding block for coding based on a Hadamard code;
   replacing means for causing the system to replace the Hadamard code with a Go-CDMA code;
   coding means for causing the system to code a data message using the multi-code coding block based on the Go-CDMA code; and
   transmitting means for causing the system to transmit the coded data message over a communication channel.

10. A computer program product for causing a system to decode a multi-code code division multiple access signal, the computer program product comprising a computer useable medium having computer program logic therein, the computer program logic comprising:
    providing means for causing the system to provide a Go-CDMA matrix;
    receiving means for causing the system to receive a coded multi-code data message over a communication channel; and
    decoding means for causing the system to decode the data message based on the Go-CDMA matrix.

11. The computer program product according to claim 10, wherein the decoding means includes means for correlating the data message by the Go-CDMA matrix.

12. A computer program product for causing a system to decode a multi-code code division multiple access signal, the computer program product comprising a computer useable medium having computer program logic therein, the computer program logic comprising:

providing means for causing the system to provide a multi-code decoding block for decoding based on a Hadamard code;

replacing means for causing the system to replace the Hadamard code with a Go-CDMA code;

receiving means for causing the system to receive the coded multi-code data message over a communication channel; and decoding means for causing the system to decode the data message using the multi-code coding block based on the Go-CDMA code.

13. A system for providing a multi-code code division multiple access signal, comprising:

a memory including program instructions, data corresponding to at least one data stream and Go-CDMA codes;

a modulation unit for modulating a signal; and a processor coupled to the memory and the modulation unit, the processor executing the program instructions to a) code at least one multi-code data message stream based on Go-CDMA codes and b) cause the modulation unit to modulate the at least one coded message stream for transmission over a communication channel.

14. The system according to claim 13, wherein the processor codes the at least one multi-code data message stream by multiplying a data message stream by the Go-CDMA codes.

15. The system according to claim 13, wherein the system is part of a mobile communication unit.

16. The system method according to claim 13, wherein the system is a base station.

17. The system according to claim 16, wherein coding is performed on more than two multi-code data message streams and wherein some of the multi-code data message streams are associated with a different mobile unit than others of the multi-code data message streams.

18. A system for providing a multi-code code division multiple access signal, comprising:

a memory including program instructions, data corresponding to at least one data stream and Go-CDMA codes;

a modulation unit for modulating a signal; and a processor coupled to the memory and the modulation unit, the processor executing the program instructions to a) provide a multi-code coding block for coding based on a Hadamard code, b) replace the Hadamard code with a Go-CDMA code, c) code a data message using the multi-code coding block based on the Go-CDMA code, and d) cause the modulation unit to modulate the coded message stream for transmission over a communication channel.

19. A system for decoding a multi-code code division multiple access signal, comprising:

a memory including program instructions and Go-CDMA codes;

a demodulation unit for demodulating a signal; and a processor coupled to the memory and the demodulation unit, the processor executing the program instructions to a) cause the modulation unit to demodulate the signal for receiving the multi-code data message stream, and b) decode the multi-code data message stream based on Go-CDMA codes.

20. The system according to claim 19, wherein the system decodes the multi-code data message by correlating the data message stream by the Go-CDMA codes.

21. A system for decoding a multi-code code division multiple access signal, comprising:

a memory including program instructions and Go-CDMA codes;

a demodulation unit for demodulating a signal; and a processor coupled to the memory and the demodulation unit, the processor executing the program instructions to a) provide a multi-code decoding block for decoding based on a Hadamard code, b) replace the Hadamard code with a Go-CDMA code, c) cause the demodulation unit to demodulate the signal to receive a multi-code data message from the communication channel, and d) decode the data message using the multi-code decoding block based on the Go-CDMA codes.

22. A method for decoding a code division multiple access signal based on Go-CDMA codes, comprising:

receiving a signal over a communication channel;

providing one or more stages of soft decision decoding blocks, each block decoding based on a Go-CDMA matrix; and decoding data messages from the signal based on the blocks.

23. The method according to claim 22, wherein one or more stages of soft decision decoding blocks are provided.

24. The method according to claim 23, wherein the single soft decision block is a multi-code decoding block.

25. The method according to claim 22, further comprising a hard decision decoding block coupled as the last stage to the one or more stages of soft decision decoding blocks.

26. A computer program product for causing a system to decode a code division multiple access signal, the computer program product comprising a computer useable medium having computer program logic therein, the computer program logic comprising:

providing means for causing the system to provide one or more stages of soft decision decoding blocks, each block decoding based on a Go-CDMA matrix;

receiving means for causing the system to receive a signal over a communication channel; and decoding means for causing the system to decode data messages from the signal based on the blocks.

27. The computer program product according to claim 26, wherein the providing means provides one or more stages of soft decision decoding blocks.

28. The computer program product according to claim 27, wherein the soft decision decoding blocks are multi-code decoding blocks.

29. The computer program product according to claim 26, further comprising providing means for providing a hard decision decoding block coupled as the last stage to the one or more stages of soft decision decoding blocks.

30. A system for decoding a code division multiple access signal, comprising:

a memory including program instructions and Go-CDMA codes;

a demodulation unit for demodulating a signal; and a processor coupled to the memory and the demodulation unit, the processor executing the program instructions to a) cause the demodulation unit to demodulate the signal for receiving a data message stream, and b) provide one or more stages of soft decision decoding blocks, each block decoding based on a Go-CDMA matrix, and c) decode the data message stream based on the blocks.

31. The system according to claim 30, wherein one or more stages of soft decision decoding blocks are provided.

32. The system according to claim 31, wherein the soft decision decoding blocks are multi-code decoding blocks.

33. The system according to claim 30, further wherein the processor further executes the program instructions to provide a hard decision decoding block coupled as the last stage to the one or more stages of soft decision decoding blocks.

* * * * *